(12) United States Patent
Nozaki

(10) Patent No.: US 11,954,542 B2
(45) Date of Patent: Apr. 9, 2024

(54) INFORMATION PROCESSING APPARATUS, METHOD, AND STORAGE MEDIUM FOR STORING PROGRAM

(71) Applicant: CANON KABUSHIKI KAISHA, Tokyo (JP)

(72) Inventor: Yuto Nozaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/354,818

(22) Filed: Jul. 19, 2023

(65) Prior Publication Data

US 2024/0031510 A1   Jan. 25, 2024

(30) Foreign Application Priority Data

Jul. 22, 2022 (JP) ................................. 2022-117430

(51) Int. Cl.
*H04N 1/60* (2006.01)
*G06K 15/00* (2006.01)
*G06K 15/02* (2006.01)

(52) U.S. Cl.
CPC ......... *G06K 15/027* (2013.01); *G06K 15/002* (2013.01); *G06K 15/1881* (2013.01)

(58) Field of Classification Search
CPC ........... H04N 1/00002; H04N 1/00031; H04N 1/00034; H04N 1/00045; H04N 1/00087; H04N 1/00092; H04N 1/00806; H04N 1/6033; H04N 1/6097; G06K 15/027; G06F 3/1288

USPC ..... 358/1.11–1.18, 3.06, 406, 504, 449, 3.23
See application file for complete search history.

(56) References Cited

U.S. PATENT DOCUMENTS

| | | | |
|---|---|---|---|
| 2013/0194622 A1* | 8/2013 | Low | H04N 1/6097 358/1.15 |
| 2018/0131818 A1* | 5/2018 | Yano | H04N 1/00087 |
| 2018/0181845 A1* | 6/2018 | Tsujita | G06K 15/007 |

FOREIGN PATENT DOCUMENTS

| | | | |
|---|---|---|---|
| JP | 2005-343066 A | | 12/2005 |
| JP | 2005343066 A | * | 12/2005 |

* cited by examiner

*Primary Examiner* — Chad Dickerson
(74) *Attorney, Agent, or Firm* — Canon U.S.A., Inc., IP Division

(57) ABSTRACT

An information processing apparatus includes a display control unit configured to cause a display unit to display a print settings screen for causing an image forming apparatus to print, on a printing medium, a plurality of patches representing colorimetry targets readable by a colorimetric apparatus; a reception unit configured to receive an instruction for the printing via the print settings screen; a print control unit configured to cause the image forming apparatus to start the printing of the plurality of patches based on the received instruction for the printing; an obtaining unit configured to obtain information related to calibration corresponding to the printing medium; and a determination unit configured to determine whether calibration has been executed for the printing medium based on the obtained information related to calibration.

22 Claims, 34 Drawing Sheets

FIG. 4A

| TEST NAME | TEST SPECIFICATION | IMAGE FORMING APPARATUS NAME | CONTROLLER | SHEET | TEST ID |
|---|---|---|---|---|---|
| TEST A | TEST SPECIFICATION A | IMAGE FORMING APPARATUS A | CONTROLLER A | PLAIN PAPER A4 | 001 |
| TEST B | TEST SPECIFICATION B | IMAGE FORMING APPARATUS B | CONTROLLER B | COATED PAPER A4 | 002 |

FIG. 4B

| TEST SPECIFICATION NAME | TOLERANCE VALUE SET | REFERENCE | PATCH SET |
|---|---|---|---|
| TEST SPECIFICATION A | TOLERANCE VALUE SET A | FOGRA51 | Fogra Media Wedge |
| TEST SPECIFICATION B | TOLERANCE VALUE SET B | JapanColor | Japan Color Control Strip |

FIG. 5A

| TOLERANCE VALUE SET NAME (502) | AVERAGE ΔE TOLERANCE LIMIT (503) | MAXIMUM ΔE TOLERANCE LIMIT (504) |
|---|---|---|
| TOLERANCE VALUE SET A | 3 | 5 |
| TOLERANCE VALUE SET B | 2 | 4 |

| REFERENCE NAME (506) | PATCH ID (507) | REFERENCE L* (508) | REFERENCE a* (509) | REFERENCE b* (510) |
|---|---|---|---|---|
| REFERENCE A | 1 | 41.11 | 45.77 | 97.10 |
| | 2 | 33.55 | 1.44 | 56.75 |
| | 3 | 43.22 | 7.66 | 24.94 |
| | 4 | 23.64 | 11.54 | 5.44 |
| | ... | ... | ... | ... |

| PATCH SET NAME (512) | PATCH ID (507) | C (514) | M (515) | Y (516) | K (517) |
|---|---|---|---|---|---|
| PATCH SET A | 1 | 100 | 0 | 0 | 0 |
| | 2 | 0 | 100 | 0 | 0 |
| | 3 | 0 | 0 | 100 | 0 |
| | 4 | 0 | 0 | 0 | 100 |
| | ... | ... | ... | ... | ... |

(511)

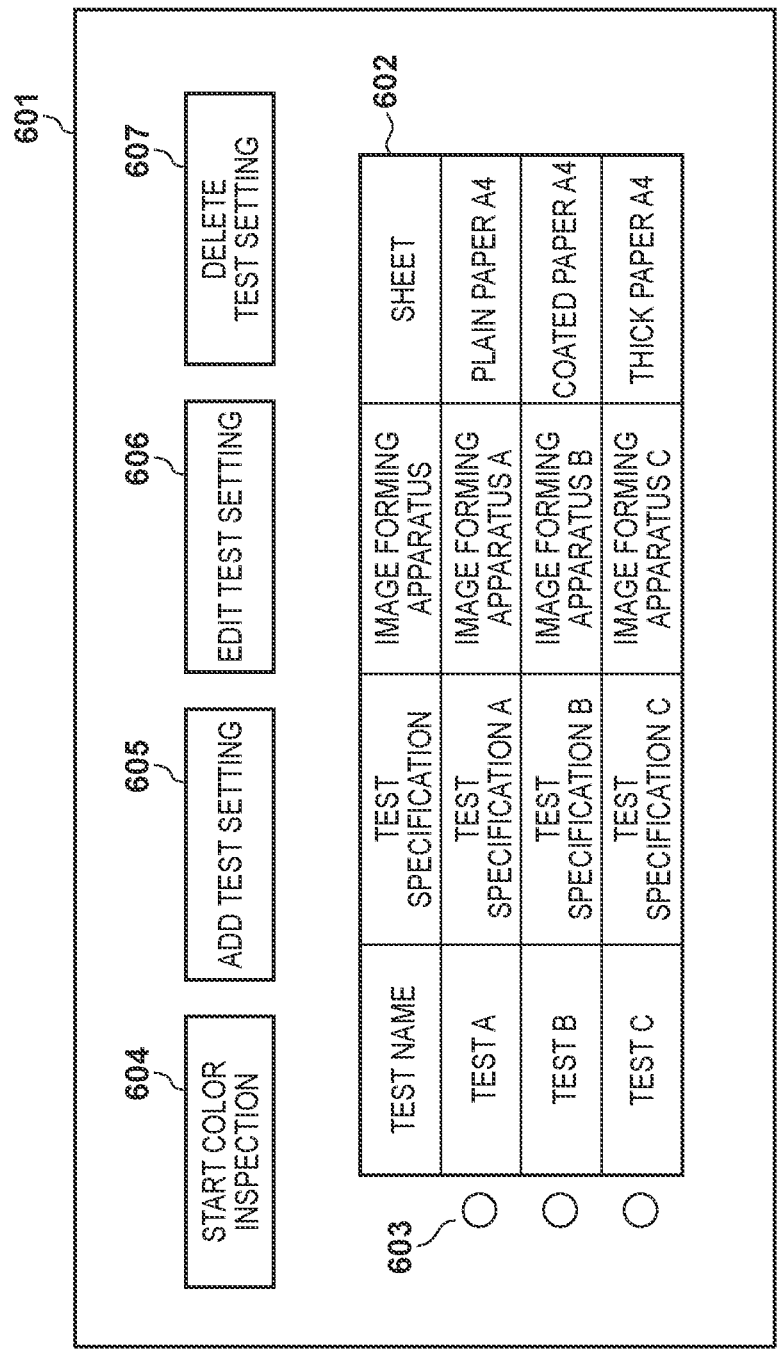

FIG. 7A — 701

| SHEET NAME (702) | SHEET TYPE (703) | ASSOCIATED CALIBRATION (704) |
|---|---|---|
| PLAIN PAPER A4 | PLAIN PAPER | FOR PLAIN PAPER |
| COATED PAPER A4 | COATED PAPER | FOR COATED PAPER |
| THICK PAPER A4 | THICK PAPER | FOR THICK PAPER |
| THICKEST COATED PAPER A4 | THICKEST COATED PAPER | FOR THICKEST COATED PAPER |

FIG. 7B — 705

| CALIBRATION NAME (706) | CALIBRATION DATE AND TIME (707) |
|---|---|
| FOR PLAIN PAPER | NOT EXECUTED |
| FOR COATED PAPER | NOT EXECUTED |
| FOR THICK PAPER | EXECUTED ON 2022/3/22 |
| FOR THICKEST COATED PAPER | NOT EXECUTED |

FIG. 7C — 708

| IMAGE FORMING APPARATUS NAME (709) | PAPER FEEDING DECK (710) | PAPER DISCHARGE TRAY (711) | INPUT PROFILE (712) |
|---|---|---|---|
| IMAGE FORMING APPARATUS A | DECK 1, DECK 2 | UPPER TRAY, LOWER TRAY | Japan color 2011 Coated, Fogra51Coated |

TEST NAME:            TEST A   802

TEST SPECIFICATION:    TEST SPECIFICATION A   803

IMAGE FORMING APPARATUS: IMAGE FORMING APPARATUS A   804

SHEET:               PLAIN PAPER A4   805

PAPER FEEDING TRAY    [▽]   806
- DECK 1
- DECK 2

PAPER DISCHARGE TRAY   [▽]   807
- UPPER TRAY
- LOWER TRAY

INPUT PROFILE    [▽]   808
- Japan color 2011 Coated
- Fogra51 Coated

[START PRINTING] 809    [CANCEL] 810

FIG. 23A

| CALIBRATION NAME | CALIBRATION DATE AND TIME | USED SHEET | USED COLORIMETRIC APPARATUS | USED HALFTONE |
|---|---|---|---|---|
| FOR PLAIN PAPER | NOT EXECUTED | PLAIN PAPER A4 | COLORIMETRIC APPARATUS A | resolution |
| FOR COATED PAPER | NOT EXECUTED | COATED PAPER A4 | COLORIMETRIC APPARATUS B | gradation |
| FOR THICK PAPER | EXECUTED ON 2022/3/22 | THICK PAPER A4 | COLORIMETRIC APPARATUS C | gradation |
| FOR THICKEST COATED PAPER | NOT EXECUTED | THICKEST COATED PAPER A4 | COLORIMETRIC APPARATUS C | resolution |

FIG. 23B

| IMAGE FORMING APPARATUS NAME | USABLE HALFTONE |
|---|---|
| IMAGE FORMING APPARATUS A | resolution, gradation |

TEST NAME: TEST A — 802

TEST SPECIFICATION: TEST SPECIFICATION A — 803

IMAGE FORMING APPARATUS: IMAGE FORMING APPARATUS A — 804

SHEET: PLAIN PAPER A4 — 805

PAPER FEEDING TRAY — 806
- DECK 1
- DECK 2

PAPER DISCHARGE TRAY — 807
- UPPER TRAY
- LOWER TRAY

INPUT PROFILE — 808
- Japan color 2011 Coated
- Fogra51 Coated

COLORIMETER TO BE USED — 2401
- COLORIMETER A
- COLORIMETER B

HALFTONE TO BE USED — 2402
- Gradation
- Resolution

[START PRINTING] 809  [CANCEL] 810

F I G. 26

| CONTROLLER | SHEET | CALIBRATION VALIDITY PERIOD | CALIBRATION DESIGNATED SHEET |
|---|---|---|---|
| CONTROLLER A | PLAIN PAPER A4 | 3 DAYS | PLAIN PAPER A4 |
| | COATED PAPER A4 | 5 DAYS | COATED PAPER A4 |
| | THICK PAPER A4 | 10 DAYS | THICK PAPER A4 |
| | THICKEST COATED PAPER A4 | 3 DAYS | THICKEST COATED PAPER A4 |

INFORMATION PROCESSING APPARATUS, METHOD, AND STORAGE MEDIUM FOR STORING PROGRAM

BACKGROUND

Technical Field

The present disclosure relates to an information processing apparatus used in a system capable of executing colorimetry, a method, and a storage medium for storing a program.

Description of the Related Art

Color quality of print products generated by image forming apparatuses can be adjusted by executing calibration in the image forming apparatuses and controllers connected to the image forming apparatuses. Japanese Patent Laid-Open No. 2005-343066 describes that when a request for confirming whether calibration is necessary is included in print instruction data received by a controller, it is determined whether calibration is necessary based on a calibration execution history, and then, when it is determined that calibration is necessary, it a user notified so as to prompt the user to perform calibration.

As a method of inspecting color quality of print products generated by image forming apparatuses, performing measurement, with a colorimetric apparatus, of a chart on which a plurality of inspection patches have been printed and comparison of that colorimetry result with an industry standard or a company-specific standard is known.

SUMMARY

The present disclosure provides an information processing apparatus for performing notification based on a calibration execution state, a method, and a storage medium for storing a program.

The present disclosure in one aspect provides an information processing apparatus comprising: at least one memory and at least one processor which function as: a display control unit configured to cause a display unit to display a print settings screen for causing an image forming apparatus to print, on a printing medium, a plurality of patches representing colorimetry targets readable by a colorimetric apparatus; a reception unit configured to receive an instruction for the printing via the print settings screen; a print control unit configured to cause the image forming apparatus to start the printing of the plurality of patches based on the received instruction for the printing; an obtaining unit configured to obtain information related to calibration corresponding to the printing medium; and a determination unit configured to determine whether calibration has been executed for the printing medium based on the obtained information related to calibration, wherein in a case where it is determined that the calibration has not been executed, the print control unit does not cause the printing to be started even when the instruction for the printing is received by the reception unit, and the display control unit causes the display unit to display a screen based on that the calibration having not been executed.

According to the present disclosure, it is possible to perform notification based on a calibration execution state.

Further features of the present disclosure will become apparent from the following description of exemplary embodiments with reference to the attached drawings.

BRIEF DESCRIPTION OF THE DRAWINGS

FIGS. 4A and 4B are diagrams illustrating test setting information stored in a color inspection server.

FIGS. 5A to 5C are diagrams illustrating test setting information.

FIG. 6 is a diagram illustrating a screen for selecting a test setting.

FIGS. 7A to 7C are diagrams illustrating information stored in a controller.

FIG. 8 is a diagram illustrating a print settings screen for a chart to be used in color inspection.

FIGS. 23A and 23B are diagrams illustrating information stored in the controller.

FIG. 24 is a diagram illustrating a print settings screen for a chart to be used in color inspection.

FIG. 26 is a diagram illustrating information stored in the color inspection server.

DESCRIPTION OF THE EMBODIMENTS

Figure 1:
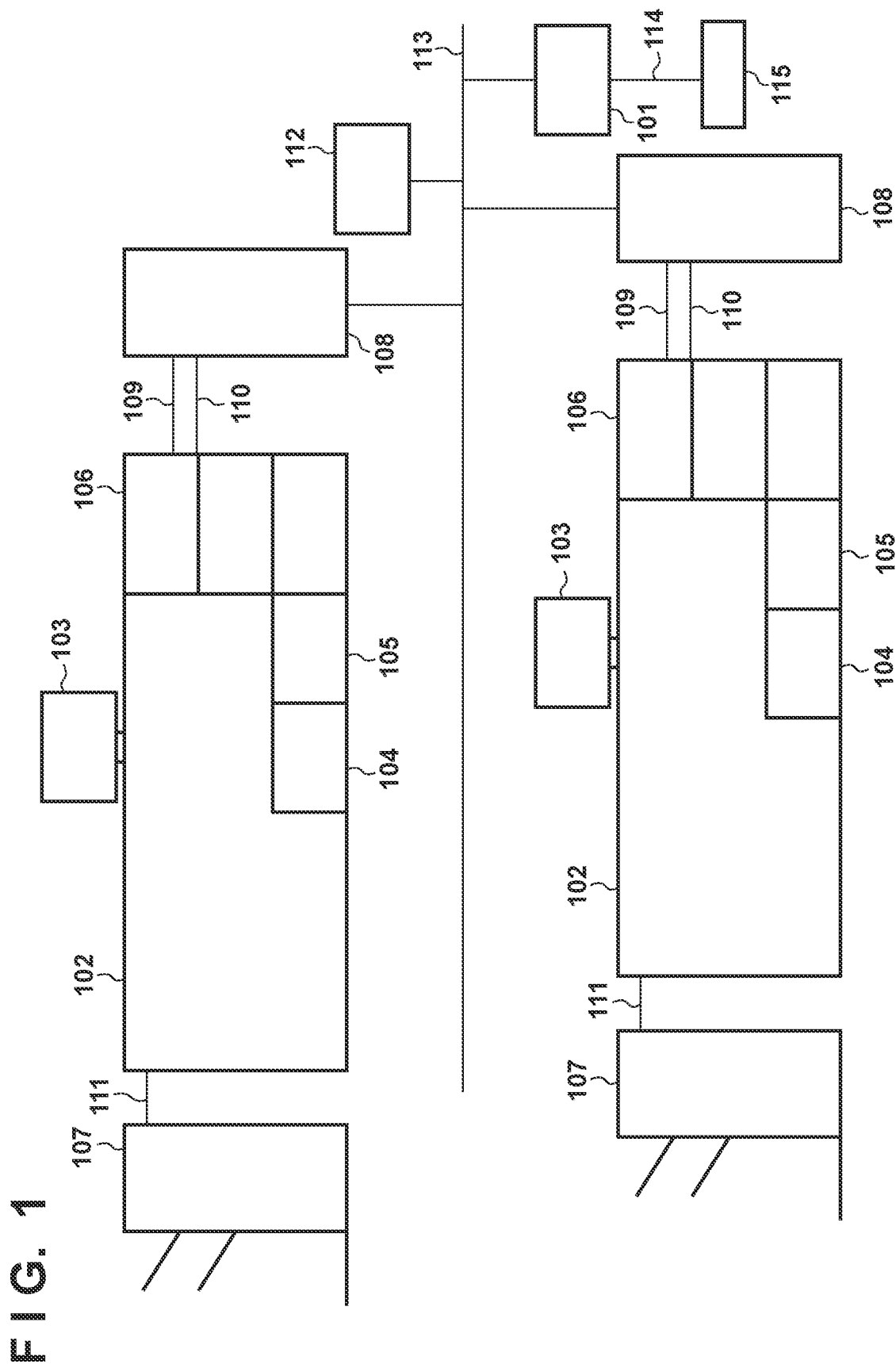
FIG. 1 is a diagram illustrating a configuration of a color inspection system.

Hereinafter, embodiments will be described in detail with reference to the attached drawings. Note, the following embodiments are not intended to limit the scope of the disclosure and/or claims. Multiple features are described in the embodiments, but limitation is not made an disclosure that requires all such features, and multiple such features may be combined as appropriate.

Furthermore, in the attached drawings, the same reference numerals are given to the same or similar configurations, and redundant description thereof is omitted.

When colorimetry is executed irrespective of a calibration execution state for a printing medium, a suitable result may not be obtained in inspection or the like in which measurements thereof are used.

According to the present disclosure, it is possible to perform notification based on a calibration execution state.

First Embodiment

In the present embodiment, a system for measuring, with a colorimetric apparatus, a chart on which a plurality of inspection patches have been printed and inspecting color quality of print products generated by an image forming apparatus by comparing the colorimetry result with an industry standard or a company-specific standard will be described. In the present embodiment, the inspection is referred to as "color inspection".

FIG. 1 is a diagram illustrating an example of a configuration of a color inspection system including a client computer, image forming apparatuses, controllers, and a color inspection server according to the present embodiment. A client computer 101 is connected to a controller 108 and a color inspection server 112, which are on the same network as the client computer 101, via a network 113.

Information necessary for color inspection (described later in FIGS. 4A and 4B) and color inspection result information (described later in FIG. 11) are stored on the color inspection server 112. Here, the information necessary for color inspection and the color inspection result information may be stored in the client computer 101 instead of the color inspection server 112. The color inspection server 112 executes processing necessary for color inspection, such as obtainment of information (described later in FIGS. 7A to 7C) of the controller 108, instruction for printing a chart (described later in FIG. 10) to be used in color inspection, and creation of a color inspection result report (described later in FIG. 11). These processes may be executed by the client computer 101 instead of the color inspection server 112. That is, at least some functions of the color inspection server 112 may be executed by the client computer 101.

An image forming apparatus 102 is, for example, an electrophotographic printing apparatus and is connected to the controller 108 via a cable 109 and a video cable 110. The image forming apparatus 102 includes a UI panel 103, a paper feeding deck 104, a paper feeding deck 105, and an optional paper feeding deck 106 including three paper feeding decks. The UI panel 103 is, for example, a user interface including a capacitive touch panel. Furthermore, the image forming apparatus 102 is connected to a paper discharging apparatus 107 via a cable 111. The paper discharging apparatus 107 includes two paper discharge trays, and stacks products outputted by the image forming apparatus 102 on the paper discharge trays.

A print job is generated by the client computer 101, transmitted to the controller 108 via the network 113, and managed by the controller 108. Furthermore, the print job is transmitted from the controller 108 to the image forming apparatus 102 via the cable 109 and the video cable 110, and the image forming apparatus 102 executes printing based on the transmitted print job. There may be a plurality of image forming apparatuses 102 on the network 113 instead of only one image forming apparatus 102. A form in which the client computer 101, the image forming apparatus 102, the controller 108, and the color inspection server 112 are connected is only an example; the present disclosure is not limited to the configuration illustrated in FIG. 1, and may be configured by various forms of connection.

The image forming apparatus 102 is capable of executing engine calibration. Engine calibration is adjustment of CMYK densities or CMYK tones such that the image forming apparatus 102 can reproduce target colors on sheets defined as a standard. CMYK are examples of colors can be printed by the image forming apparatus 102 and represent cyan (C), magenta (M), yellow (Y), and K (black). In the present embodiment, CMYK will be described as colors that can be printed by the image forming apparatus 102; however, other colors, such as light cyan and light magenta, may be printable. Since CMYK densities or CMYK tones gradually change according to a printing amount and elapsed time, in order to reproduce target colors, engine calibration needs to be performed periodically in the image forming apparatus 102.

The controller 108 is capable of executing controller calibration. Controller calibration is an adjustment for outputting consistent colors by differences in color appearance and surface property being absorbed for each sheet and is performed for each sheet. The adjustment is performed using, for example, a one-dimensional look-up table (1D LUT) is set for each color of coloring agents. The colors and surface property of sheets vary for each type. Therefore, when printing is performed with the same settings for all the sheets, colors change depending on the sheet, and colors that are close to the target cannot be achieved. Therefore, by performing controller calibration for each sheet, colors outputted by the image forming apparatus 102 for each sheet are corrected so as to be close to the target, and as a result, colors close to the target can be realized consistently for each sheet.

Target colors cannot be reproduced on a sheet to be used in a state in which controller calibration has not been executed for the sheet. Therefore, when controller calibration has not been performed for a sheet to be used in color inspection, the color inspection may be failed. Whereas engine calibration is an adjustment executed by the image forming apparatus 102 for sheets defined as a standard, controller calibration is an adjustment executed by the controller 108 for each sheet. Since a surface property and color appearance of a sheet to be used in printing varies depending on the type of the sheet, reproduced colors vary depending on the type of sheet. Therefore, color quality adjustment and color inspection need to be performed for each type of sheet. Color quality adjustment for each type of sheet is performed by calibration in the controller 108. In the following, when calibration is mentioned, assume that it is referring to calibration in the controller.

Figure 2:
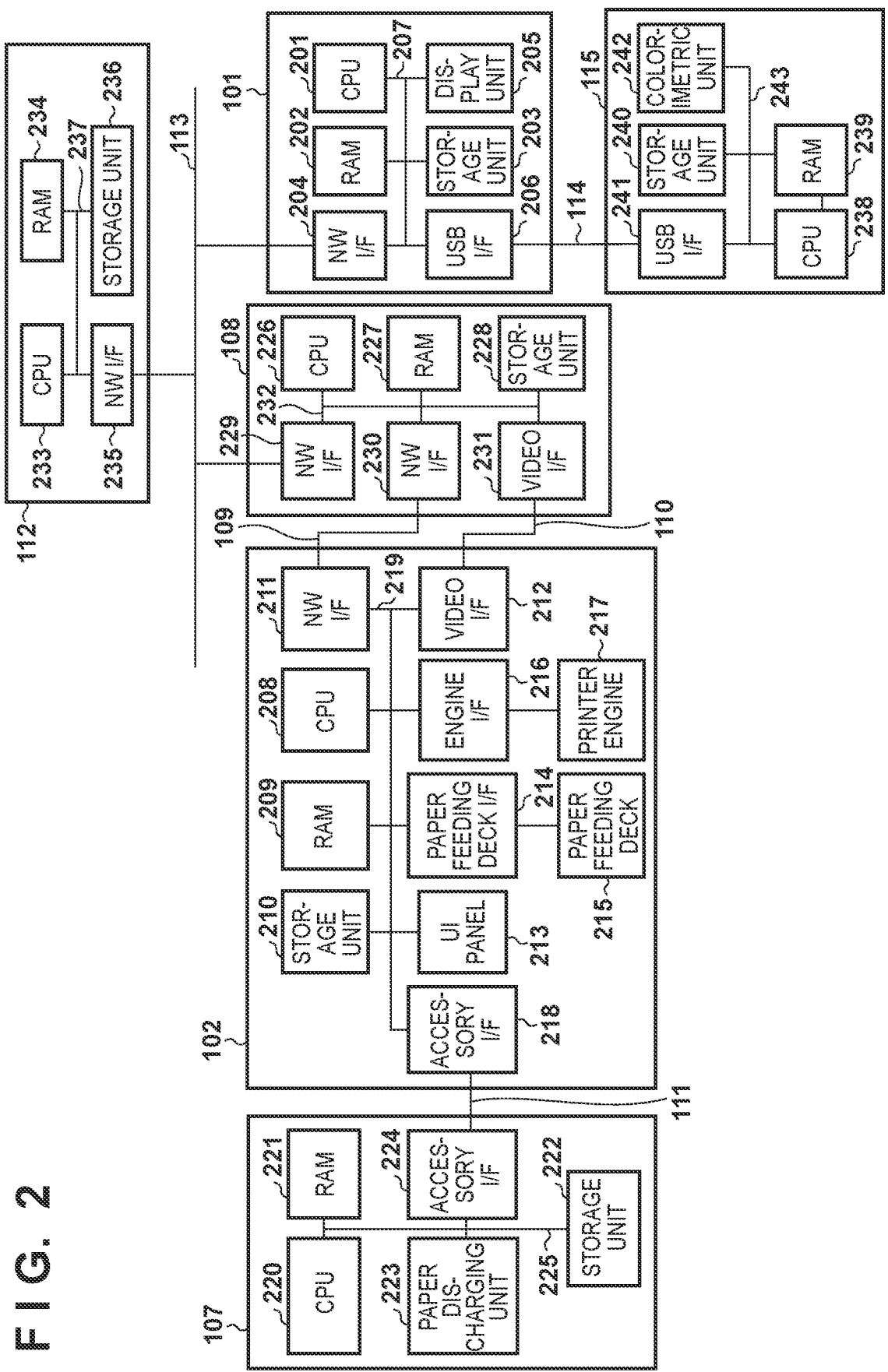
FIG. 2 is a hardware block diagram illustrating a control configuration of apparatuses.

FIG. 2 is a block diagram illustrating an example of a control configuration of the client computer 101, the image forming apparatus 102, the controller 108, and the color inspection server 112 according to the present embodiment. A configuration of the client computer 101 will described.

A CPU 201 performs control and calculation in each unit of the client computer 101 via a system bus 207. For example, display control for displaying various user interface screens on a display unit 205 and print control for controlling printing by the image forming apparatus 102 are performed. The CPU 201 executes a program stored in a storage unit 203 and loaded into a RAM 202. The RAM 202 is a type of general volatile memory that can be accessed directly from the CPU 201 and is used as a working area of the CPU 201 or another temporary data storage region. The storage unit 203 functions as a temporary storage region and a working memory during operation of the client computer 101. The operation of the client computer 101 according to the present embodiment is realized by, for example, the CPU 201 executing a program stored in the storage unit 203 by loading the program into the RAM 202.

A network interface (NW I/F) 204 is connected to an NW I/F 229 of the controller 108 via the network 113 and performs communication between the client computer 101 and the controller 108. The NW I/F 204 is also connected to an NW I/F 235 of the color inspection server 112 via the network 113 and performs communication between the client computer 101 and the color inspection server 112. The display unit 205 is a user interface for displaying information of the client computer 101 to the user. For example, the display unit 205 is a monitor display. A USB I/F 206 is connected to a USB I/F 241 of a colorimetric apparatus 115 via a cable 114 and performs communication between the client computer 101 and the colorimetric apparatus 115.

A configuration of the image forming apparatus 102 will be described.

A CPU 208 performs control and calculation in each unit of the image forming apparatus 102 via a system bus 219. The CPU 208 executes a program stored in a storage unit 210 and loaded into a RAM 209. The RAM 209 is a type of general volatile memory that can be accessed directly from the CPU 208 and is and is used as a working area of the CPU 208 or another temporary data storage region. The storage unit 210 functions as a temporary storage region and a working memory during operation of the image forming apparatus 102. The operation of the image forming apparatus 102 according to the present embodiment is realized by, for example, the CPU 208 executing a program stored in the storage unit 210 by loading the program into the RAM 209.

An NW I/F 211 is connected to an NW I/F 230 of the controller 108 via the cable 109 and performs communication between the image forming apparatus 102 and the controller 108. A video I/F 212 is connected to a video I/F 231 of the controller 108 via the video cable 110 and communicates image data between the image forming apparatus 102 and the controller 108. A UI panel 213 is a hardware configuration of the UI panel 103 and is a user interface for receiving all of the operations with respect to the image forming apparatus 102. A paper feeding deck I/F 214 communicates with a paper feeding deck 215. The paper feeding deck 215 collectively refers to the paper feeding deck 104, the paper feeding deck 105, and the optional paper feeding deck 106 of FIG. 1 as a hardware configuration. An engine I/F 216 performs communication control of a printer engine 217. An accessory I/F 218 is connected to an accessory I/F 224 of the paper discharging apparatus 107 via the cable 111 and performs communication between the image forming apparatus 102 and the paper discharging apparatus 107.

A configuration of the paper discharging apparatus 107 will be described.

A CPU 220 performs control and calculation in each unit of the paper discharging apparatus 107 via a system bus 225. The CPU 220 executes a program stored in a storage unit 222 and loaded into a RAM 221. The RAM 221 is a type of general volatile memory that can be accessed directly from the CPU 220 and is used as a working area of the CPU 220 or another temporary data storage region. The storage unit 222 functions as a temporary storage region and a working memory during operation of the paper discharging apparatus 107. The operation of the paper discharging apparatus 107 according to the present embodiment is realized by, for example, the CPU 220 executing a program stored in the storage unit 222 by loading the program into the RAM 221.

A paper discharging unit 223 monitors an operation for performing discharge to a paper discharge tray provided in the paper discharging apparatus 107 and a stack state of each tray.

A configuration of the controller 108 will be described.

A CPU 226 performs control and calculation in each unit of the controller 108 via a system bus 232. The CPU 226 executes a program stored in a storage unit 228 and loaded into a RAM 227. The RAM 227 is a type of general volatile memory that can be accessed directly from the CPU 226 and is used as a working area of the CPU 226 or another temporary data storage region. The storage unit 228 functions as a temporary storage region and a working memory during operation of the controller 108. The operation of the controller 108 according to the present embodiment is realized by, for example, the CPU 226 executing a program stored in the storage unit 228 by loading the program into the RAM 227.

The NW I/F 229 is connected to the NW I/F 235 of the color inspection server 112 via the network 113 and the NW I/F 204 of the client computer 101. The controller 108 communicates with the color inspection server 112 using the connection between the NW I/F 229 and the NW I/F 235. The controller 108 also communicates with the client computer 101 using the connection between the NW I/F 229 and the NW I/F 204. The NW I/F 230 is connected to the NW I/F 211 of the image forming apparatus 102 via the cable 109 and performs communication between the controller 108 and the image forming apparatus 102. The video I/F 231 is connected to the video I/F 212 of the image forming apparatus 102 via the video cable 110 and communicates image data between the controller 108 and the image forming apparatus 102.

A configuration of the color inspection server 112 will be described.

A CPU 233 performs control and calculation in each unit of the color inspection server 112 via a system bus 237. The CPU 233 executes a program stored in a storage unit 236 and loaded into a RAM 234. The RAM 234 is a type of general volatile memory that can be accessed directly from the CPU 233 and is used as a working area of the CPU 233 or another temporary data storage region. The storage unit 236 functions as a temporary storage region and a working memory during operation of the color inspection server 112. The operation of the color inspection server 112 according to the present embodiment is realized by, for example, the CPU 233 executing a program stored in the storage unit 236 by loading the program into the RAM 234. The NW I/F 235 is connected to the NW I/F 204 of the client computer 101 via the network 113 and performs communication between the color inspection server 112 and the client computer 101. The NW I/F 235 is also connected to the NW I/F 229 of the controller 108 via the network 113 and performs communication between the color inspection server 112 and the controller 108.

A configuration of the colorimetric apparatus 115 will be described.

A CPU 238 performs control and calculation in each unit of the colorimetric apparatus 115 via a system bus 243. The CPU 238 executes a program stored in a storage unit 240 and loaded into a RAM 239. The RAM 239 is a type of general volatile memory that can be accessed directly from the CPU 238 and is used as a working area of the CPU 238 or another temporary data storage region. The storage unit 240 functions as a temporary storage region and a working memory during operation of the colorimetric apparatus 115. The operation of the colorimetric apparatus 115 according to the present embodiment is realized by, for example, the CPU 238 executing a program stored in the storage unit 240 by loading the program into the RAM 239. The colorimetric unit 242 measures patches on a printing medium, such as a sheet, and temporarily stores that colorimetry result in the RAM 239 or the storage unit 240. The CPU 210 of the client computer 101 obtains the temporarily stored colorimetry result from the RAM 239 or the storage unit 240 of the colorimetric apparatus 115 via the cable 114.

In the present embodiment, data transmission and reception between apparatuses are performed by an apparatus on the obtaining side making a request for data and an apparatus on the request receiving side transmitting data. However, data may be proactively transmitted without a request having been received.

Figure 3:
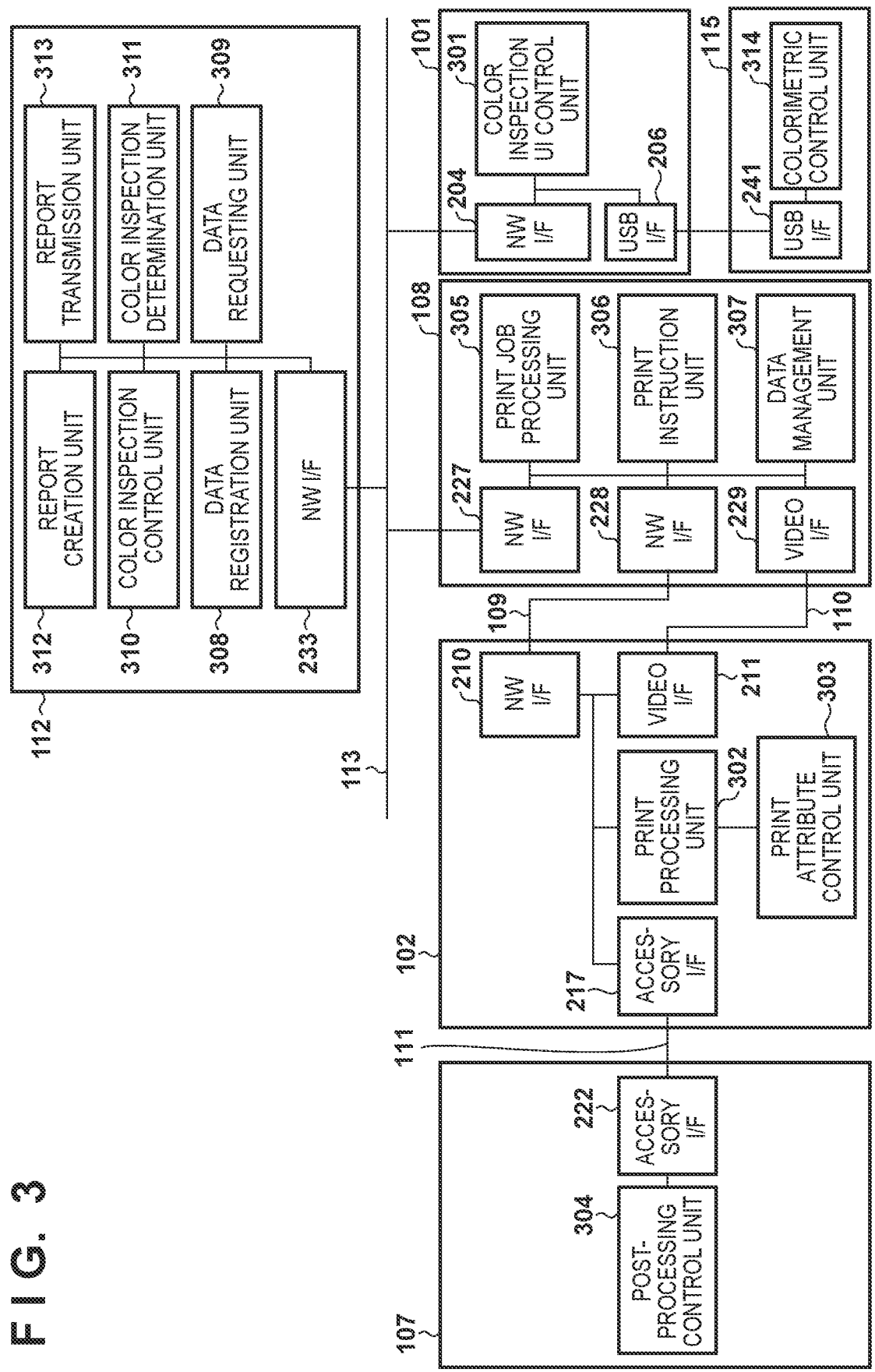
FIG. 3 is a software block diagram illustrating a control configuration of apparatuses.

FIG. 3 is a software block diagram illustrating an example of a configuration of respective control units of the client computer 101, the image forming apparatus 102, the paper discharging apparatus 107, the controller 108, the color inspection server 112, and the colorimetric apparatus 115.

The client computer 101 includes a color inspection UI control unit 301, and the color inspection UI control unit 301 is a module present in the RAM 202 or the storage unit 203 of the client computer 101. The color inspection UI control unit 301 is executed by the CPU 201 of the client computer 101. The color inspection UI control unit controls displaying of various user interface (UI) screens.

The image forming apparatus 102 includes a print processing unit 302 and a print attribute control unit 303, and these are modules present in the RAM 209 or the storage unit 210 of the image forming apparatus 102 and are executed by the CPU 208 of the image forming apparatus 102. The print processing unit 302 and the print attribute control unit 303 control printing on a printing medium, such as a sheet, based on a print job.

The paper discharging apparatus 107 includes a post-processing control unit 304. The post-processing control unit 304 is a module present in the RAM 221 or the storage unit 222 of the paper discharging apparatus 107 and is executed by the CPU 220 of the paper discharging apparatus 107. The post-processing control unit 304 controls execution of post-processing on a printing medium on which printing has been performed in the image forming apparatus 102.

The controller 108 includes a print job processing unit 305, a print instruction unit 306, and a data management unit 307, and these are modules present in the RAM 227 or the storage unit 228 and are executed by the CPU 226 of the controller 108. The print job processing unit 305 executes a print job according to an instruction from the print instruction unit 306. The print instruction unit 306 instructs the print job processing unit 305 to execute a print job. The data management unit 307 manages various types of information stored in the controller 108.

The color inspection server 112 includes a data registration unit 308, a data requesting unit 309, a color inspection control unit 310, a color inspection determination unit 311, a report creation unit 312, and a report transmission unit 313, and these are modules present in the RAM 234 or the storage unit 236. These modules are executed by the CPU 233 of the color inspection server 112. The data registration unit 308 manages various types of information stored in the color inspection server 112. The management here includes editing of information, registration of new information, and the like. The data requesting unit 309 obtains information necessary for color inspection. The color inspection control unit 310 controls execution of color inspection by instructing the colorimetric apparatus 115. The color inspection determination unit 311 determines whether the color quality of the image forming apparatus 102 has passed or failed based on a result of color inspection. The report creation unit 312 and the report transmission unit 313 create a report based on a result of color inspection and transmit the report to another apparatus, such as the client computer 101.

The colorimetric apparatus 115 includes a colorimetric control unit 314. The colorimetric control unit 314 is a module present in the RAM 239 or the storage unit 240 of the colorimetric apparatus 115 and is executed by the CPU 238 of the colorimetric apparatus 115. The colorimetric control unit 314 controls execution of colorimetry on a printed color inspection chart.

FIG. 4A is a diagram illustrating an example of test setting information stored in the color inspection server 112. A test setting is a collection of settings or conditions for color inspection, and a plurality of types of test settings are provided. The user can execute color inspection with various conditions by selecting a desired test setting.

A test setting information table 401 is a table indicating what kind of information is included in each of the test settings. The test setting information table 401 is stored in the storage unit 236 of the color inspection server 112. Test name information 402 is information indicating a name of a test setting. Test specification information 403 is information representing a test specification to be applied to color inspection. Details of the test specification information 403 will be described later with reference to FIG. 4B. Image forming apparatus name information 404 is information representing a name of the image forming apparatus 102 to be a target of color inspection. Controller information 405 is information representing a name of the controller 108 connected to the image forming apparatus 102 to be a target of color inspection. Sheet information 406 is information representing a sheet to be used in color inspection. Test ID information 407 is identification information for identifying a test setting. The test ID information 407 is a numeral for uniquely defining a test setting, and pieces of the test ID information 407 do not overlap with each other.

FIG. 4B is a diagram illustrating an example of information constituting a test specification. Here, the test specification is a collection of information to be an inspection reference for when color inspection is executed.

A test specification information table 408 is a table indicating information constituting a test specification. The test specification information table 408 is stored in the storage unit 236 of the color inspection server 112. A configuration of the test specification information table 408 indicated here is only an example, and the test specification information table 408 is not limited to the configuration illustrated in this example. Test specification name information 409 is information indicating a name of a test specification. Tolerance value set information 410 is information indicating a tolerance value set to be applied to a test specification. Details of the tolerance value set information 410 will be described later in FIGS. 5A to 5C. Reference information 411 is information indicating a reference to be applied to a test specification. The reference information 411 will be described later in FIGS. 5A to 5C. Patch set information 412 is information indicating a patch set to be applied to a test specification. The patch set information 412 will be described later in FIGS. 5A to 5C.

FIG. 5A is a diagram illustrating an example of information constituting a tolerance value set. Here, a tolerance value set is information defining a tolerable range for when color inspection is executed. A tolerance value set information table 501 is a table indicating information included in a tolerance value set. A configuration of the tolerance value set information table 501 illustrated here is only an example and the tolerance value set information table 501 is not limited to the configuration illustrated in this example. Tolerance value set name information 502 is information indicating a name defined for the tolerance value set information 410. An average ΔE tolerance limit 503 is information indicating an average ΔE tolerance limit in the tolerance value set information 410. The average ΔE tolerance limit is a boundary value tolerated for a value obtained by averaging color differences between a measured value of each patch and a value indicated by the reference. When an average ΔE obtained as a result of colorimetry is less than or equal to the average ΔE tolerance limit 503, it is determined that color inspection is passed, and when the average ΔE is greater than the average ΔE tolerance limit 503, it is determined that color inspection is failed. A maximum ΔE tolerance limit 504 is information indicating a maximum ΔE tolerance limit in the tolerance value set information 410. The maximum ΔE tolerance limit 504 is a boundary value tolerated for a maximum value among color differences between a measured value of each patch and a value indicated by the reference. When a maximum ΔE obtained as a result of colorimetry is less than or equal to the maximum ΔE tolerance limit 504, it is determined that color inspection is passed, and when the maximum ΔE is greater than the maximum ΔE tolerance limit 504, it is determined that color inspection is failed.

FIG. 5B is a diagram illustrating an example of information constituting a reference. Here, the reference is information to be a reference for comparison with a measurement result for when color inspection is executed. A reference information table 505 is a table indicating information included in a reference. A configuration of the reference information table 505 illustrated here is only an example and the reference information table 505 is not limited to the configuration illustrated in this example. In the present embodiment, the reference of the color of each patch is determined based on the L*a*b* color space, but the color reference of each patch may be determined based on the other color space.

Reference name information 506 is information indicating a name defined for the reference information 411. Patch ID information 507 is information indicating a value for identifying a patch included in the reference information 411. Since the patch ID information 507 is a value for identifying a patch, the values of the patch ID information 507 do not overlap among patches. Reference L* information 508 is information indicating a value to be a reference for L* in a patch. Reference a* information 509 is information indicating a value to be a reference for a* in a patch. Reference b* information 510 is information indicating a value to be a reference for b* in a patch.

FIG. 5C is a diagram illustrating an example of information constituting a patch set. Here, the patch set is information defining a color inspection chart (described later in FIG. 10) to be printed when color inspection is executed. A patch set information table 511 is a table indicating information included in a patch set. A configuration of the patch set information table 511 illustrated here is only an example and the patch set information table 511 is not limited to the configuration illustrated in this example. Patch set name information 512 is information indicating a name defined for the patch set information 412. Cyan signal value information 514 is information defining a signal value of cyan in each patch. Magenta signal value information 515 is information defining a signal value of magenta in each patch. Yellow signal value information 516 is information defining a signal value of yellow in each patch. Black signal value information 517 is information defining a signal value of black in each patch.

FIG. 6 is a diagram illustrating an example of a screen for selecting a test setting to be used in color inspection. A test setting selection screen 601 indicates a screen for selecting a test setting for color inspection. The test setting selection screen 601 is displayed on the display unit 205 of the client computer 101 by the color inspection UI control unit 301 of the client computer 101. A region 602 is a region in which a list of test setting information is displayed. The test setting information that can be selected by the user is displayed in the region 602. The information displayed in the region 602 is obtained from the test setting information table 401 stored in the storage unit 236 of the color inspection server 112. Alternatively, the information may be displayed based on default display data for receiving a selection from the user. Buttons 603 are buttons for selecting a test setting to be used for color inspection. The buttons 603 are arranged by the side of the region 602. When selecting a test setting, the user presses the button 603 by the side of a row displaying the information of the test setting that they wish to select in the region 602. A button 604 is a button to be pressed when color inspection is to be started. A button 605 is a button to be pressed when a test setting is to be added. A button 606 is a button to be pressed when any of the test settings displayed in the region 602 is to be edited. The user can edit any of the test settings when they press the button 606 after having selected any of the test settings using a button 603. A button 607 is a button to be pressed when any of the test settings displayed in the region 602 is to be deleted. The user can delete any of the test settings when they press the button 607 after having selected any of the test settings using a button 603.

FIGS. 7A to 7C are diagrams illustrating an example of information stored in the controller 108. The color inspection server 112 obtains information of FIGS. 7A to 7C from the controller 108.

FIG. 7A is a diagram illustrating an example of sheet information. A sheet information table 701 is a table indicating information included in the sheet information. The sheet information table 701 is stored in the storage unit 228 of the controller 108. A configuration of the sheet information table 701 illustrated here is only an example and the sheet information table 701 is not limited to the configuration illustrated in this example. Sheet name information 702 is information representing a name of a sheet. Sheet type information 703 is information representing a type of sheet. The sheet type information 703 may be divided into types, for example, by difference among surface properties of sheets and, for example, is divided into types, such as plain paper and coated paper. Calibration information 704 is calibration information indicating a name of calibration associated with a sheet represented by the sheet name information 702. A calibration name indicated by the calibration information 704 is used for identifying what type of sheet the calibration has been associated with. For example, in a case of calibration associated with a sheet whose type of sheet is plain paper, a name such as "for plain paper" is given.

FIG. 7B is a diagram illustrating an example of calibration information. The calibration information indicates information related to calibration and is, for example, information of a name of calibration, information of a date and time of calibration execution, and the like. A calibration information table 705 is a table indicating information included in the calibration information. The calibration information table 705 is stored in the storage unit 228 of the controller 108. A configuration of the calibration information table 705 illustrated here only is an example and the calibration information table 705 is not limited to the configuration illustrated in this example. Calibration name information 706 is information representing a name of calibration. Calibration date and time information 707 is information representing a date and time of calibration execution.

FIG. 7C is a diagram illustrating an example of image forming apparatus information. An image forming apparatus information table 708 is a table indicating information included in the image forming apparatus information. The image forming apparatus information table 708 is stored in the storage unit 228 of the controller 108. A configuration of the image forming apparatus information table 708 illustrated here is only an example and the image forming apparatus information table 708 is not limited to the configuration illustrated in this example. Image forming apparatus name information 709 is information representing a name of the image forming apparatus 102 connected with the controller 108. Paper feeding deck information 710 is information representing information of the paper feeding deck 104, the paper feeding deck 105, and the optional paper feeding deck 106 provided in the image forming apparatus 102 connected to the controller 108. Paper discharge tray information 711 is information representing information of a paper discharge tray provided in the paper discharging apparatus 107 connected to the image forming apparatus 102 connected to the controller 108. Input profile information 712 is information representing an input profile that can be used in the image forming apparatus 102 connected to the controller 108. Here, the input profile is a data file in which color reproduction characteristics of the image forming apparatus 102 are described.

FIG. 8 is a diagram illustrating an example of a print settings screen for performing print settings for a chart to be used in color inspection. A print settings screen 801 is displayed after a test setting is selected in the test setting selection screen 601.

The print settings screen 801 is displayed on the display unit 205 of the client computer 101 by the color inspection UI control unit 301 of the client computer 101. A region 802 is a region in which the test name information 402 of the test setting selected in the test setting selection screen 601 is displayed. A region 803 is a region in which the test specification information 403 of the test setting selected in the test setting selection screen 601 is displayed. A region 804 is a region in which the image forming apparatus name information 404 of the test setting selected in the test setting selection screen 601 is displayed. A region 805 is a region in which the test sheet information 406 of the test setting selected in the test setting selection screen 601 is displayed. The information displayed in the region 802, the region 803, the region 804, and the region 805 is obtained from the test setting information table 401.

A pull-down menu 806 is a pull-down menu for selecting a paper feeding deck to be used from among the paper feeding deck 104, the paper feeding deck 105, and the optional paper feeding deck 106 provided in the image forming apparatus 102, which executes printing. A pull-down menu 807 is a pull-down menu for selecting a paper discharge tray to be used from among the paper discharge trays provided in the paper discharging apparatus 107, which is connected to the image forming apparatus 102, which executes printing. A pull-down menu 808 is a pull-down menu for selecting an input profile to be used from among the input profiles that can be used in the image forming apparatus 102, which executes printing. The contents displayed in the pull-down menu 806, the pull-down menu 807, and the pull-down menu 808 are determined based on the image forming apparatus information table 708 obtained from the controller 108. A print start button 809 is a button to be pressed when printing is to be started. A cancel button 810 is a button to be pressed when the print settings are to be canceled and color inspection is to be aborted.

Figure 9:
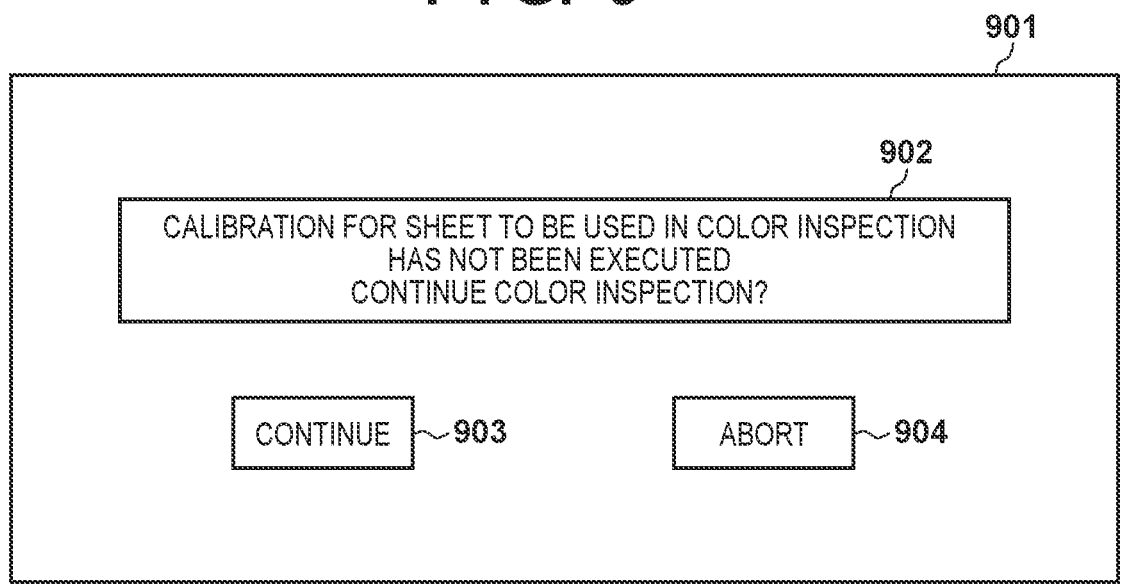
FIG. 9 is a diagram illustrating a screen for prompting calibration execution confirmation.

FIG. 9 is a diagram illustrating an example of a warning screen to be displayed when it is determined that confirmation of calibration execution is necessary at the time of color inspection execution. A warning screen 901 is displayed on the display unit 205 of the client computer 101 by the color inspection UI control unit 301 of the client computer 101. A region 902 is a region in which a warning message necessitating confirmation of calibration execution is displayed. A color inspection continuation button 903 is a button to be pressed when color inspection is to be continued. An abort button 904 is a button to be pressed when color inspection is to be aborted.

Figure 10:
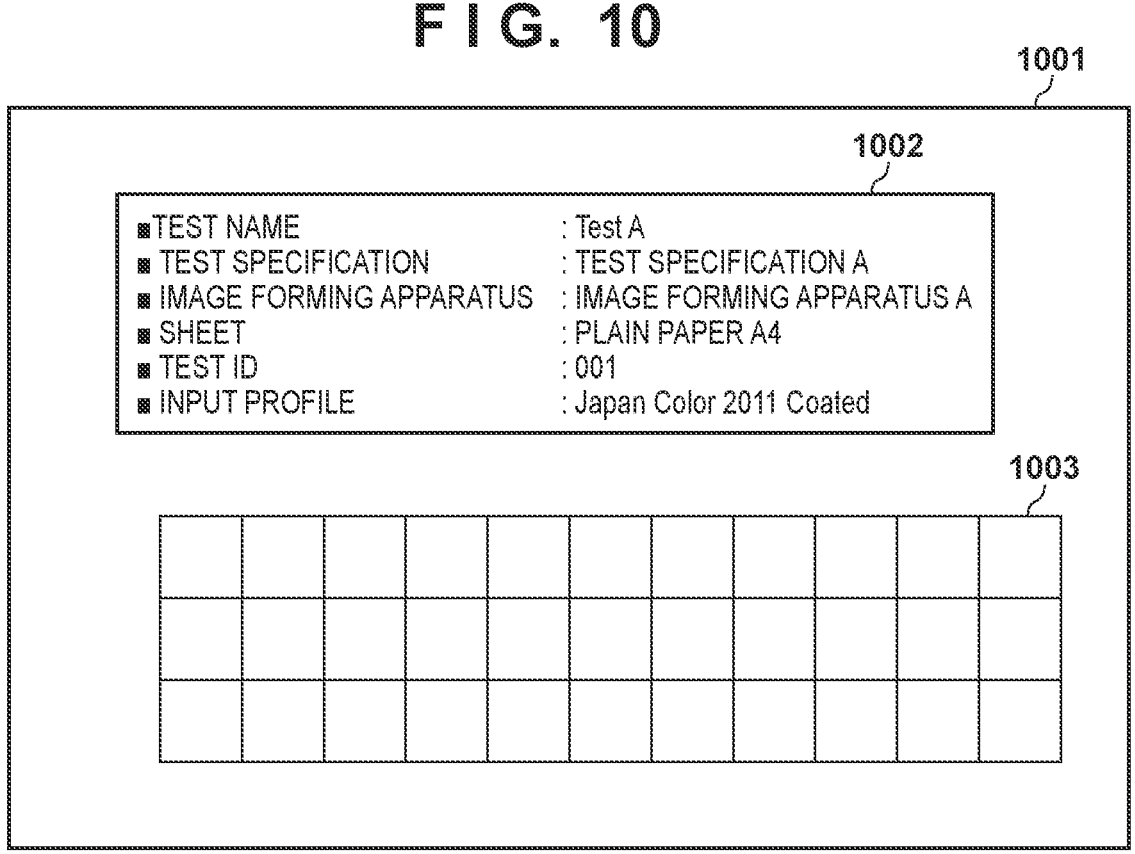
FIG. 10 is a diagram illustrating a color inspection chart.

FIG. 10 is a diagram illustrating an example of a color inspection chart to be used in color inspection. A color inspection chart 1001 is printed by the image forming apparatus 102. The color inspection chart 1001 is a color inspection chart to be used in color inspection. A region 1002 is a region in which color inspection settings information is printed. The region 1002 is printed based on the information of the test setting information table 401. A region 1003 is a region in which patches used in color inspection are printed. The patches in the region 1003 are printed based on the information of the patch set information table 511.

Figure 11:
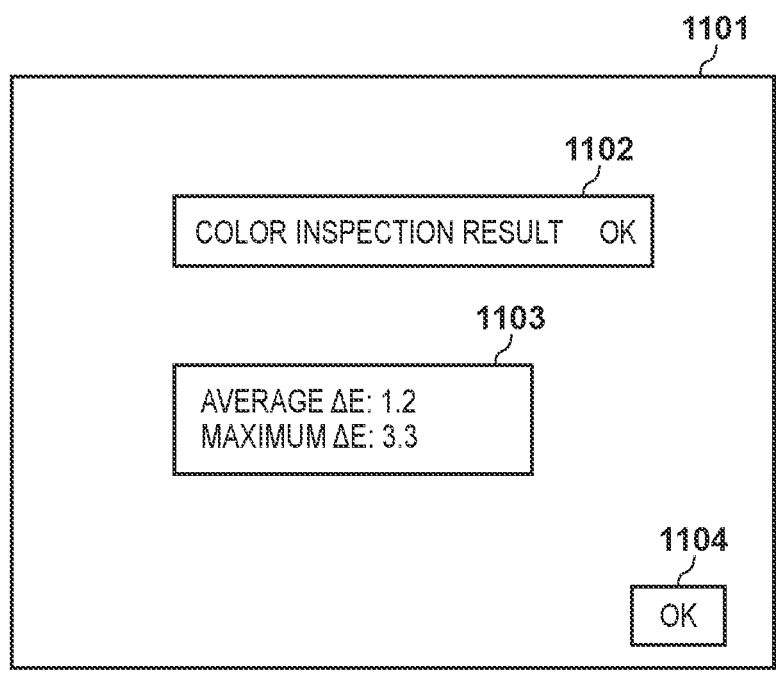
FIG. 11 is a diagram illustrating a screen displaying a color inspection report.

FIG. 11 is a diagram illustrating an example of a screen displaying a color inspection report. A report display screen 1101 is displayed on the display unit 205 by the color inspection UI control unit 301 of the client computer 101 based on color inspection result data stored in the RAM 234 or the storage unit 236 of the color inspection server 112. The color inspection result data is, for example, an average ΔE representing an average color difference of the patches calculated based on a color difference between a measured value of each patch and a value indicated by the reference, a maximum ΔE representing a maximum color difference of the patches, and the like. A region 1102 is a region in which a color inspection result is displayed. A region 1103 is a region in which detailed information of color inspection is displayed. In the region 1103, detailed information related to color inspection, such as the above-described average ΔE and maximum ΔE, is displayed. An OK button 1104 is a button to be pressed when report display is to be ended.

Figure 12A:
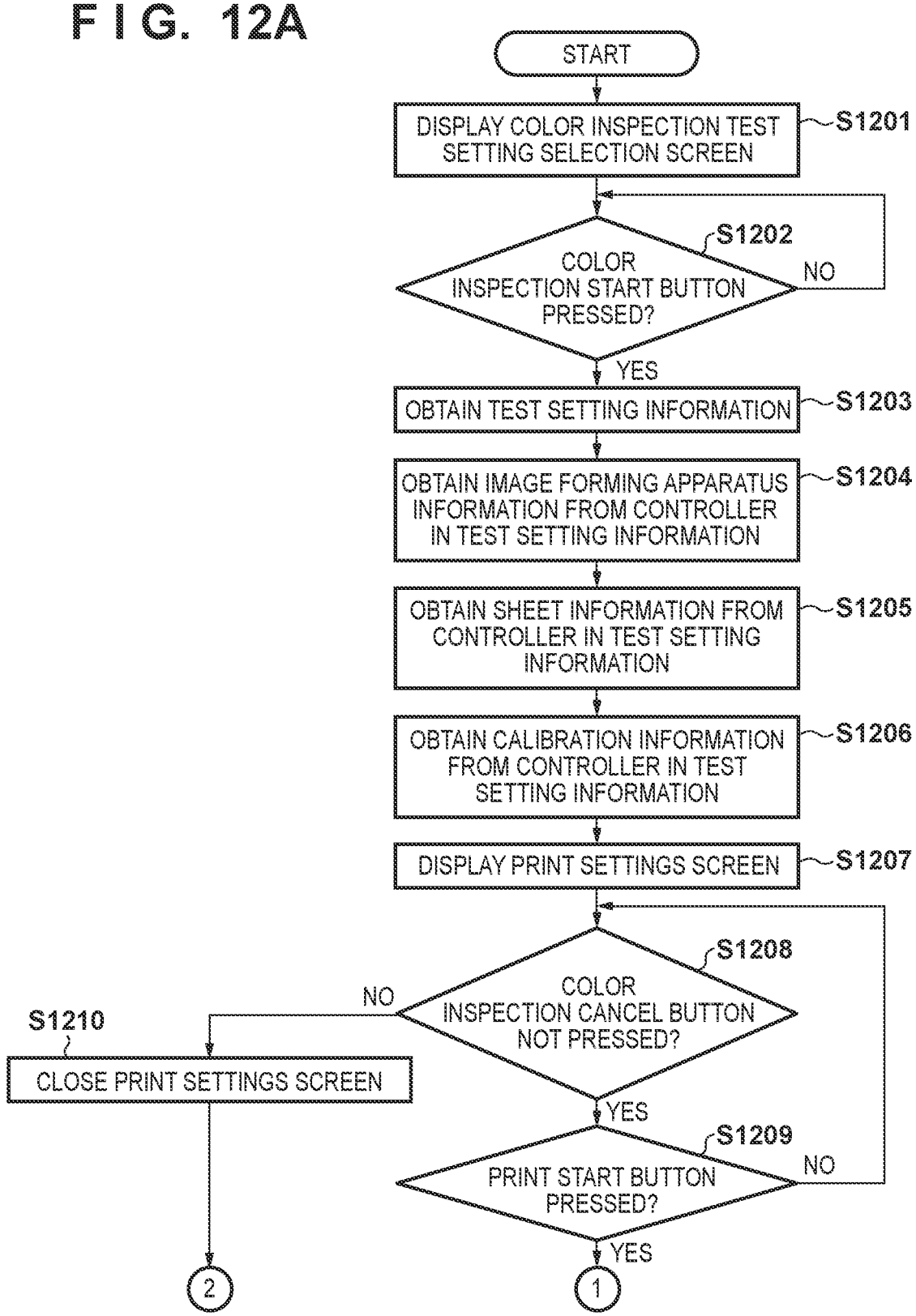
FIGS. 12A and 12B are flowcharts for explaining control processing in the color inspection system.
Figure 12B:
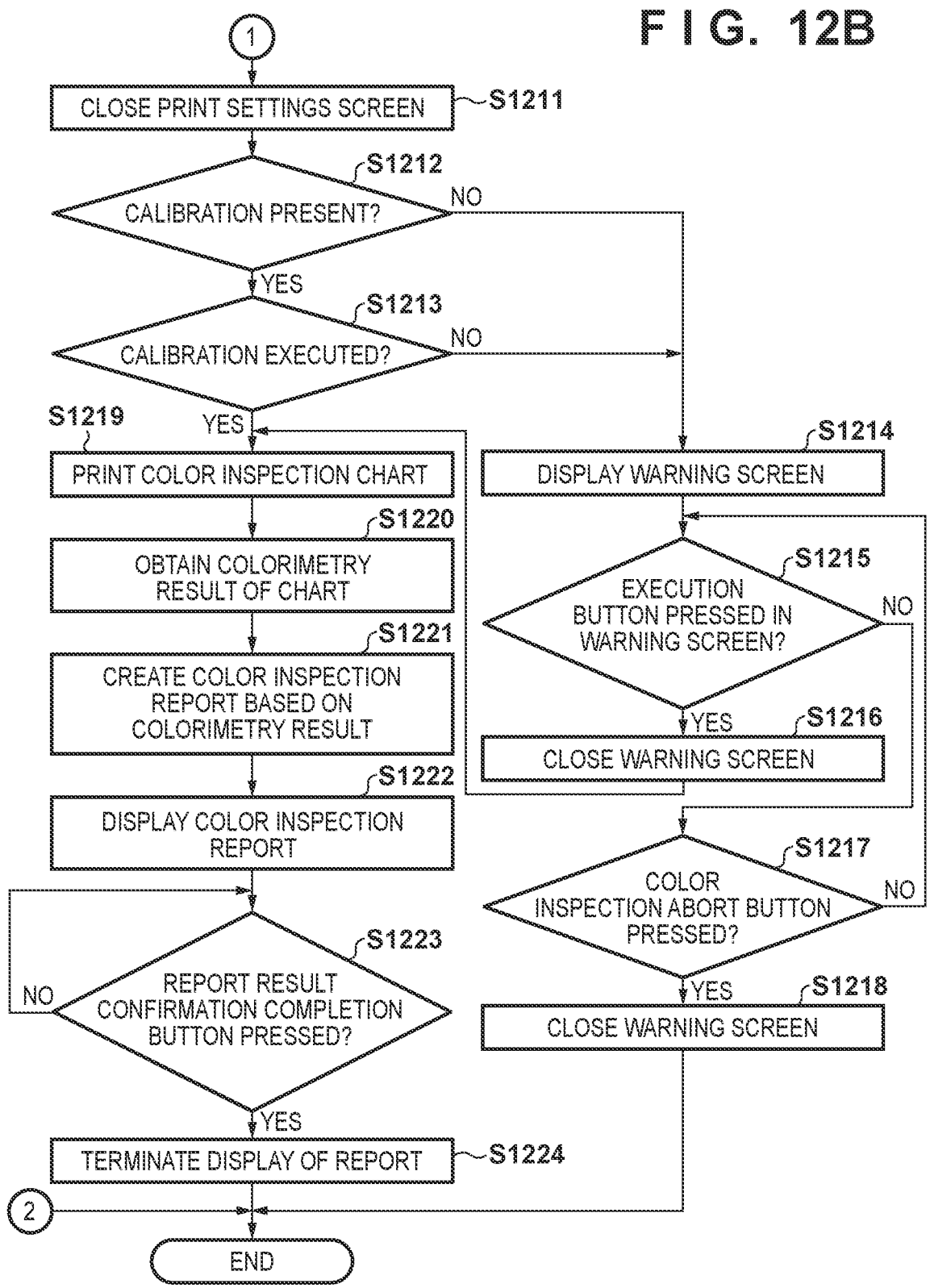

FIGS. 12A and 12B are flowcharts for explaining control processing in the color inspection system according to the present embodiment. In FIGS. 12 A and 12B, a calibration execution state for a sheet to be used in color inspection is determined, and color inspection execution is controlled using a result of that determination. The processing of FIGS. 12A and 12B is executed by the CPU 201 of the client computer 101. However, when the processing is executed by a CPU of another apparatus, something to that effect will be mentioned. In addition, an operation of each apparatus to which a request for processing has been made from the CPU 201 of the client computer 101 is executed by a CPU of each apparatus.

In step S1201, the color inspection UI control unit 301 of the client computer 101 displays the test setting selection screen 601 on the display unit 205. In step S1202, the CPU 201 of the client computer 101 determines whether the button 604 for starting color inspection has been pressed. When it is determined that the button 604 has not been pressed, the processing of step S1202 is repeated. Meanwhile, when it is determined that the button 604 has been pressed, the processing proceeds to step S1203.

In step S1203, the CPU 201 of the client computer 101 obtains information of the test setting selected in step S1201 and stores the information in the RAM 202 of the client computer 101. For example, the CPU 201 of the client computer 101 obtains the information by making a request for the test information table 401 to the color inspection server 112. The test setting information obtained in step S1203 is, for example, the test name information 402, the test specification information 403, the image forming apparatus name information 404, the controller information 405, the test sheet information 406, and the test ID information 407 illustrated in FIG. 4.

In step S1204, the CPU 201 of the client computer 101 obtains the image forming apparatus information table 708 by making a request for the image forming apparatus information table 708 to the controller 108 indicated by the controller information 405 obtained in step S1203. The CPU 201 of the client computer 101 stores the obtained image forming apparatus information table 708 in the RAM 202 of the client computer 101.

In step S1205, the CPU 201 of the client computer 101 obtains the sheet information table 701 by making a request for the sheet information table 701 to the controller 108 indicated by the controller information 405 obtained in step S1203. The CPU 201 of the client computer 101 stores the obtained sheet information table 701 in the RAM 202 of the client computer 101.

In step S1206, the CPU 201 of the client computer 101 obtains the calibration information table 705 by making a request for the calibration information table 705 to the controller 108 indicated by the controller information 405 obtained in step S1203. The CPU 201 of the client computer 101 stores the obtained calibration information table 705 in the RAM 202 of the client computer 101.

In step S1207, the CPU 201 of the client computer 101 displays the print settings screen 801 on the display unit 205 via the color inspection UI control unit 301. The contents of the display of the print settings screen 801 is determined based on the test setting information obtained in step S1203 and the information of the image forming apparatus information table 708 obtained in step S1204.

In step S1208, the CPU 201 of the client computer 101 determines whether the cancel button 810 in the print settings screen 801 has been pressed. When it is determined that the cancel button 810 has been pressed, the processing proceeds to step S1210. In step S1210, the CPU 201 of the client computer 101 terminates the display of the print settings screen 801 on the display unit 205 and terminates the color inspection processing. Meanwhile, when it is determined that the cancel button 810 has not been pressed, the processing proceeds to step S1209.

In step S1209, the CPU 201 of the client computer 101 determines whether the print start button 809 has been pressed. When it is determined that the print start button 809 has not been pressed, the processing is repeated from step S1208. Meanwhile, when it is determined that the print start button 809 has been pressed, the processing proceeds to step S1211. In step S1211, the CPU 201 of the client computer 101 terminates the display of the print settings screen 801 on the display unit 205 via the color inspection UI control unit 301.

In step S1212, the CPU 201 of the client computer 101 determines whether calibration associated with the test sheet information 406 obtained in step S1203 is present using the sheet information table 701 obtained in step S1205. The determination of step S1212 is executed by the CPU 201 of the client computer 101 determining whether the calibration information 704 corresponding to the test sheet information 406 obtained in step S1203 is present in the sheet information table 701 obtained in step S1205. When the calibration information 704 corresponding to the test sheet information 406 obtained in step S1203 is present in the sheet information table 701 obtained in step S1205, the processing proceeds to step S1213. Step S1213 will be described later. Meanwhile, when the calibration information 704 corresponding to the test sheet information 406 obtained in step S1203 is not present in the sheet information table 701 obtained in step S1205, the processing proceeds to step S1214.

In step S1214, the CPU 201 of the client computer 101 displays the warning screen 901 on the display unit 205 via the color inspection UI control unit 301. In the present embodiment, as described above, when calibration associated with the test sheet information 406 in the test setting selected in the test setting selection screen 601 is not present, the user can be prompted to confirm whether to continue color inspection.

In step S1215, the CPU 201 of the client computer 101 determines whether the color inspection continuation button 903 of the warning screen 901 has been pressed. When it is determined that the color inspection continuation button 903 has been pressed, the processing proceeds to step S1216. In step S1216, the CPU 201 of the client computer 101 terminates the display of the warning screen 901 on the display unit 205 via the color inspection UI control unit 301 and proceeds to step S1219. Step S1219 will be described later. Meanwhile, when it is determined that the color inspection continuation button 903 has not been pressed, the processing proceeds to step S1217. In step S1217, the CPU 201 of the client computer 101 determines whether the abort button 904 of the warning screen 901 has been pressed. When it is determined that the abort button 904 has not been pressed, the processing is repeated from step S1215. Meanwhile, when it is determined that the abort button 904 has been pressed, the processing proceeds to step S1218. In step S1218, the CPU 201 of the client computer 101 terminates the display of the warning screen 901 on the display unit 205 and terminates the color inspection processing.

In step S1213, the CPU 201 of the client computer 101 determines whether the calibration indicated by the calibration information 704 determined to be present in step S1212 has been performed. The determination of step S1213 is performed using the calibration information table 705 obtained in step S1206. In the determination of step S1213, the CPU 201 of the client computer 101 first references the calibration information table 705 obtained in step S1206. Then, the determination is performed by the calibration information 704 determined to be present in step S1212 and the corresponding calibration date and time information 707 being confirmed. When it is determined that the calibration indicated by the calibration information 704 has not been executed, the processing proceeds to step S1214. In the present embodiment, as described above, when calibration associated with the test sheet information 406 in the test setting selected in the test setting selection screen 601 has not been executed, the user can be prompted to confirm whether to continue color inspection. Meanwhile, when it is determined that the calibration indicated by the calibration information 704 has been executed, the processing proceeds to step S1219.

In step S1219, the CPU 201 of the client computer 101 makes a request to the CPU 233 of the color inspection server 112 to print the color inspection chart 1001. When making the request, the CPU 201 of the client computer 101 transmits the test setting information obtained in step S1203 to the color inspection server 112. Upon receiving the request, the CPU 233 of the color inspection server 112 instructs the controller 108 to print the color inspection chart 1001 based on the test setting information obtained in step S1203. Upon receiving the instruction, the controller 108 instructs the image forming apparatus 102 to print the color inspection chart 1001.

After step S1219, the color inspection chart 1001 is printed in the image forming apparatus 102. Then, the user sets the color inspection chart 1001 in the colorimetric apparatus 115 and instructs colorimetry execution via the screen 1301 displayed on the client computer 101. A colorimetry result is transmitted from the colorimetric apparatus 115 to the client computer 101.

In step S1220, the CPU 201 of the client computer 101 transmits a colorimetry result of the color inspection chart 1001 to the color inspection server 112. The CPU 233 of the color inspection server 112 stores the colorimetry result of the color inspection chart 1001 in the RAM 234 or the storage unit 236.

In step S1221, the CPU 233 of the color inspection server 112 creates via the color inspection determination unit 311 and the report creation unit 312 a color inspection report using the colorimetry result obtained in step S1220 and the test specification information 403 obtained in step S1203. The created color inspection report is stored in the storage unit 236 or the RAM 234. The CPU 233 of the color inspection server 112 transmits the created color inspection report to the client computer 101 via the report transmission unit 313.

In step S1222, the CPU 233 of the client computer 101 displays via the color inspection UI control unit 301 the report display screen 1101 on the display unit 205 based on the color inspection report created in step S1221.

In step S1223, the CPU 201 of the client computer 101 determines whether the OK button 1104 for terminating the display of the report on the report display screen 1101 has been pressed. When it is determined that the OK button 1104 has not been pressed, the processing of step S1223 is repeated. Meanwhile, when it is determined that the OK button 1104 has been pressed, the processing proceeds to step S1224. In step S1224, the CPU 201 of the client computer 101 terminates the display of the report display screen 1101 on the display unit 205 and terminates the color inspection processing.

Next, a flow of processing for when the color inspection chart 1001 is measured in the client computer 101 will be described with reference to FIGS. 13, 14, 15, and 16.

Figure 13:
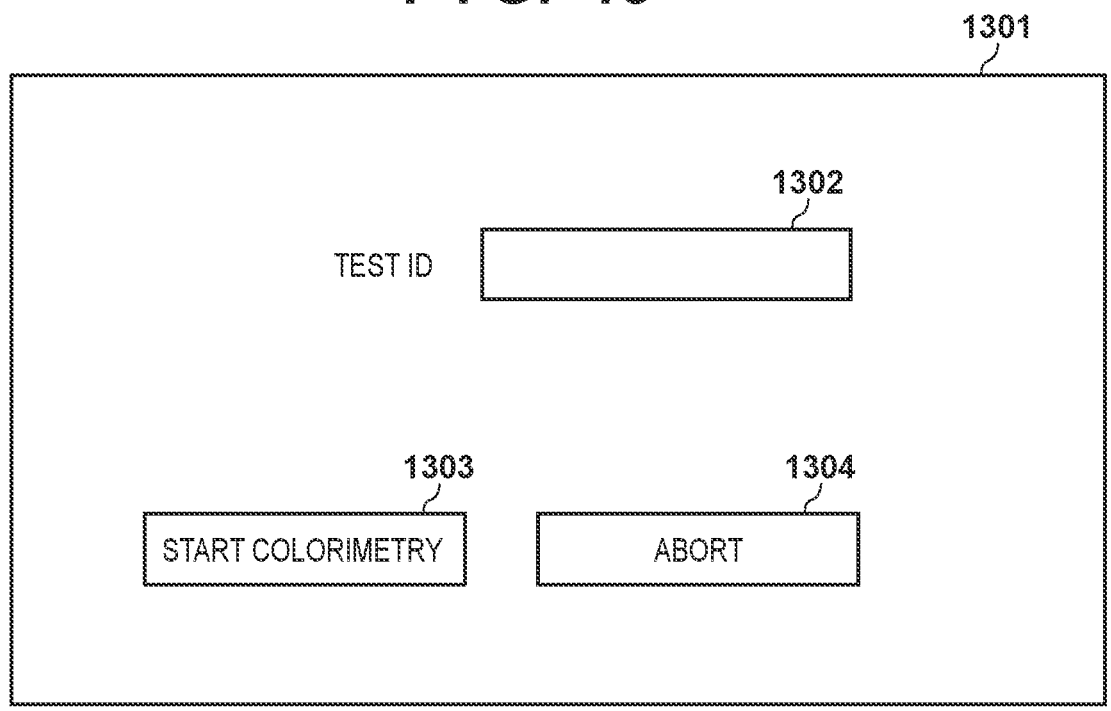
FIG. 13 is a diagram illustrating a screen for inputting colorimetry information.

FIG. 13 is a diagram illustrating an example of a screen for inputting colorimetry information. A colorimetry information input screen 1301 is a screen for inputting colorimetry information and is displayed on the display unit 205 in the client computer 101. A region 1302 is a region for inputting the test ID information 407 printed on the color inspection chart 1001. A colorimetry result and the tolerance value set information 410 are associated by the test ID information 407, and it becomes possible for the color inspection server 112 to perform color inspection determination. A colorimetry start button 1303 is a button to be pressed when colorimetry is to be started. An abort button 1304 is a button to be pressed when colorimetry is to be aborted.

Figure 14:
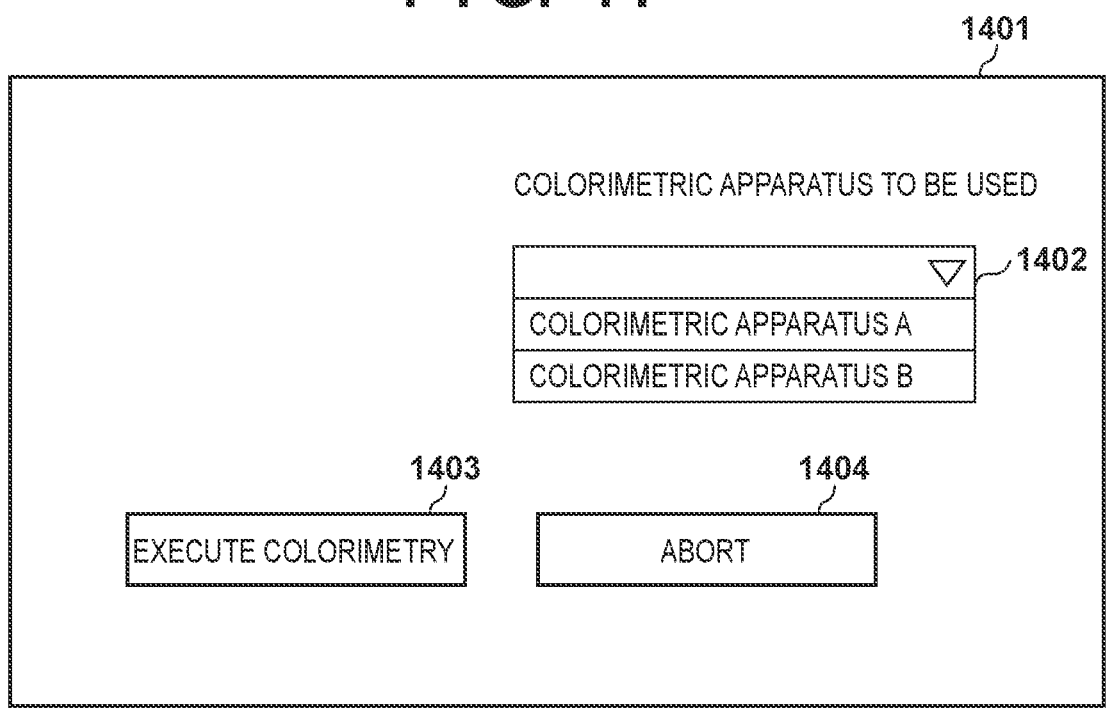
FIG. 14 is a diagram illustrating a screen to be displayed at the start of colorimetry.

FIG. 14 is a diagram illustrating an example of a screen that is displayed at the start of colorimetry. A colorimetry start screen 1401 is displayed on the display unit 205 by the CPU 201 of the client computer 101 at the start of colorimetry. A pull-down menu 1402 is a pull-down menu for selecting the colorimetric apparatus 115 to be used in colorimetry. In the pull-down menu 1402, the colorimetric apparatus 115 connected to the USB I/F 206 of the client computer 101 is displayed as an option. A colorimetry execution button 1403 is a button to be pressed when colorimetry is to be executed. An abort button 1404 is a button to be pressed when colorimetry is to be aborted.

Figure 15:
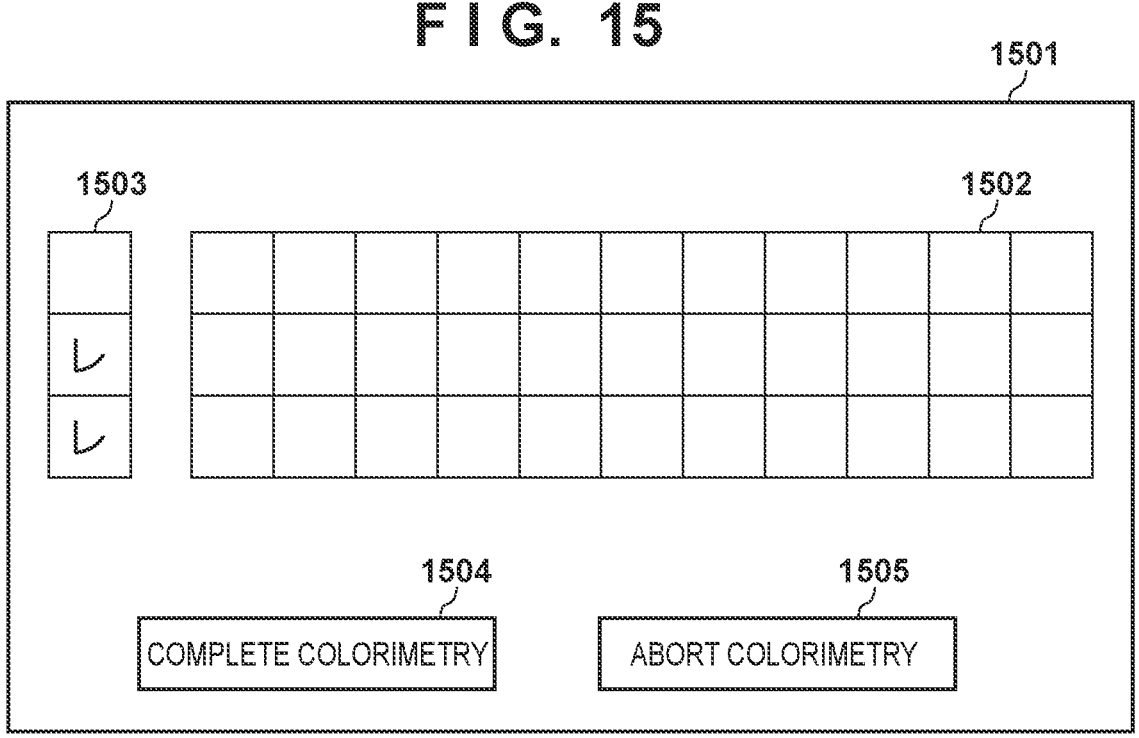
FIG. 15 is a diagram illustrating a screen displaying a state of colorimetry.

FIG. 15 is a diagram illustrating an example of a screen displaying a state of colorimetry. A colorimetry state display screen 1501 is a screen for displaying a state of colorimetry to the user and is displayed on the display unit 205 by the CPU 201 of the client computer 101. A region 1502 is a region for displaying an image of a chart to be measured on the screen. The image of the chart to be measured corresponds to the region 1003 of the color inspection chart 1001. A region 1503 is a region in which whether colorimetry has been executed in each row of the chart to be measured is displayed using a symbol. The region 1503 displays to the user whether colorimetry for each row of the chart has been completed by, for example, a check mark being displayed to the side of a measured row of the image of the chart displayed in the region 1502. A colorimetry completion button 1504 is a button to be pressed when colorimetry is to be completed. An abort button 1505 is a button to be pressed when colorimetry is to be aborted.

Figure 16A:
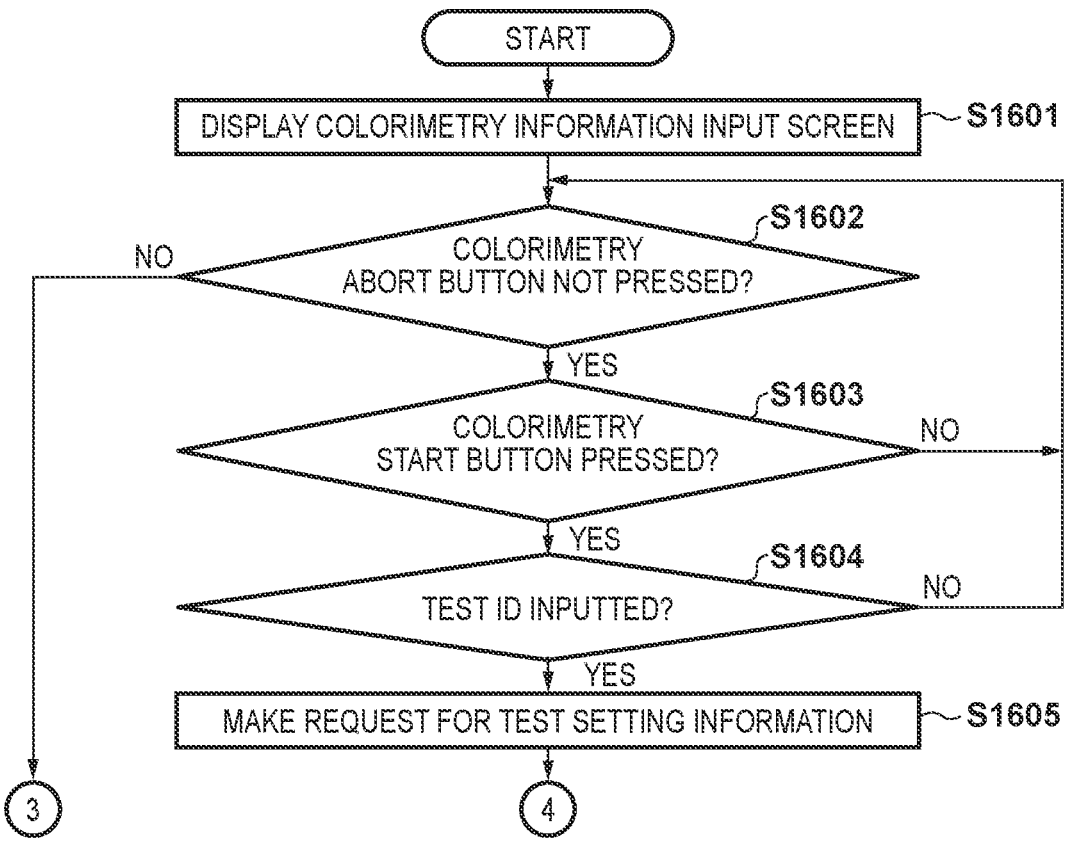
FIGS. 16A and 16B are flowcharts for explaining processing for when a color inspection chart is measured.
Figure 16B:
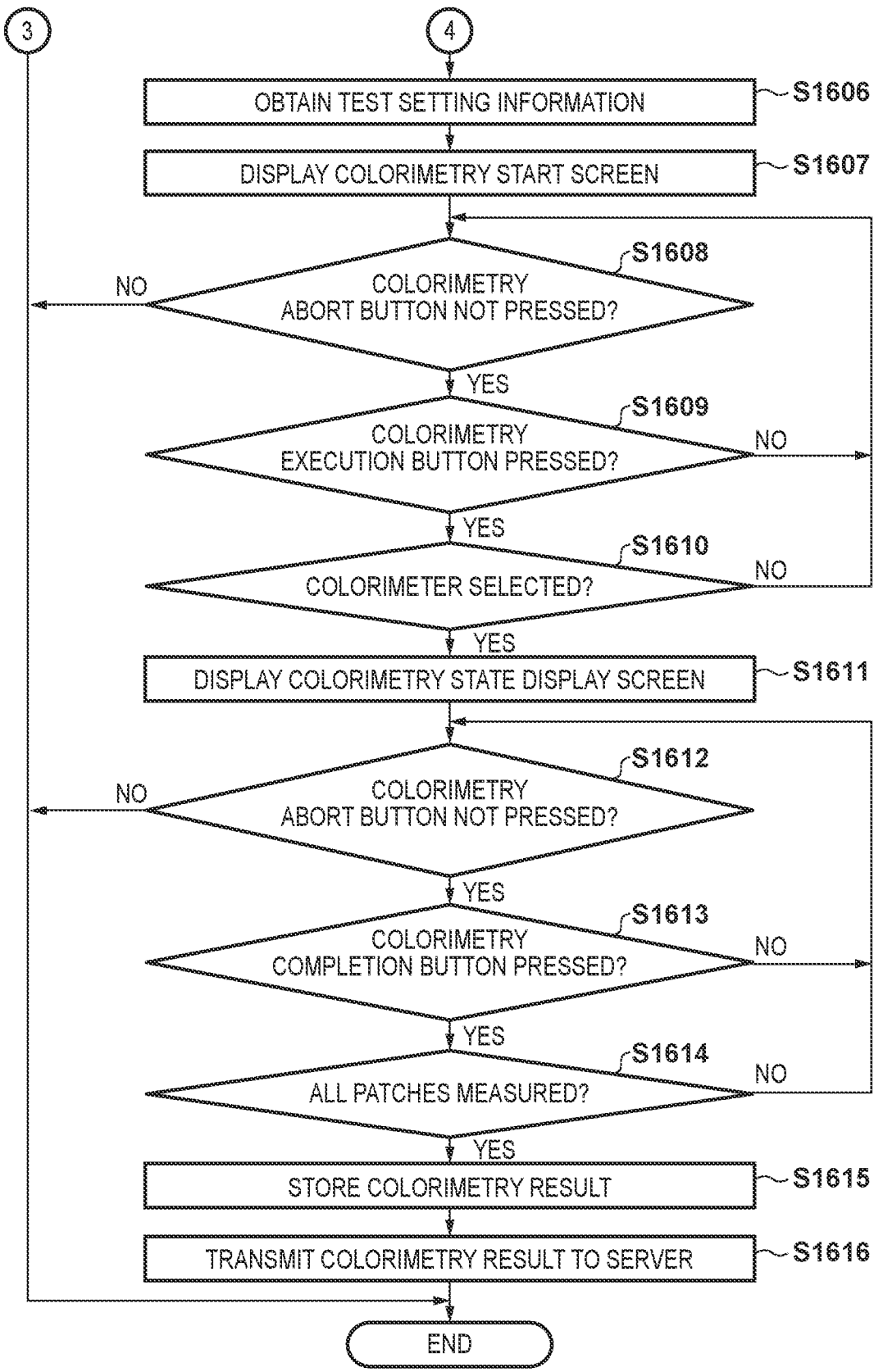

FIGS. 16A and 16B are flowcharts for explaining processing for when the color inspection chart 1001 is measured. The processing of FIGS. 16A and 16B is executed by the client computer 101 and the colorimetric apparatus 115 after step S1219. The processing of FIGS. 16A and 16B is executed by the CPU 201 of the client computer 101. However, when the processing is executed by a CPU of another apparatus, something to that effect will be mentioned. In addition, an operation of each apparatus to which a request for processing has been made from the CPU 201 of the client computer 101 is executed by a CPU of each apparatus.

In step S1601, the CPU 201 of the client computer 101 displays the colorimetry information input screen 1301 on the display unit 205. In step S1602, the CPU 201 of the client computer 101 determines whether the abort button 1304 of the colorimetry information input screen 1301 has been pressed. When it is determined that the abort button 1304 has been pressed, the colorimetry processing is terminated. Meanwhile, when it is determined that the abort button 1304 has not been pressed, the processing proceeds to step S1603.

In step S1603, the CPU 201 of the client computer 101 determines whether the colorimetry start button 1303 on the colorimetry information input screen 1301 has been pressed. When it is determined that the colorimetry start button 1303 has not been pressed, the processing is repeated from step S1602. Meanwhile, when it is determined that the colorimetry start button 1303 has been pressed, the processing proceeds to step S1604.

In step S1604, the CPU 201 of the client computer 101 determines whether the test ID information 407 has been inputted in the region 1302 on the colorimetry information input screen 1301. When it is determined that the test ID information 407 has not been inputted in the region 1302, the processing is repeated from step S1602. Meanwhile, when it is determined that the test ID information 407 has inputted in the region 1302, the processing proceeds to step S1605.

In step S1605, the CPU 201 of the client computer 101 makes a request for information of a test setting corresponding to the inputted test ID information 407 to the color inspection server 112. Upon request, the color inspection server 112 transmits the test setting information to the client computer 101.

In step S1606, the CPU 201 of the client computer 101 obtains the test setting information transmitted from the color inspection server 112. In step S1607, the CPU 201 of the client computer 101 displays the colorimetry start screen 1401 on the display unit 205. In step S1608, the CPU 201 of the client computer 101 determines whether the abort button 1404 on the colorimetry start screen 1401 has been pressed. When it is determined that the abort button 1404 has been pressed, the colorimetry processing is terminated. Meanwhile, when it is determined that the abort button 1404 has not been pressed, the processing proceeds to step S1609.

In step S1609, the CPU 201 of the client computer 101 determines whether the colorimetry execution button 1403 on the colorimetry start screen 1401 has been pressed. When it is determined that the colorimetry execution button 1403 has not been pressed, the processing is repeated from step S1608. Meanwhile, when it is determined that the colorimetry execution button 1403 has been pressed, the processing proceeds to step S1610.

In step S1610, the CPU 201 of the client computer 101 determines whether the colorimetric apparatus 115 is selected in the pull-down menu 1402 for selecting a colorimetric apparatus on the colorimetry start screen 1401. When it is determined that the colorimetric apparatus 115 has not been selected in the pull-down menu 1402, the processing is repeated from step S1608. Meanwhile, when it is determined that the colorimetric apparatus 115 has been selected in the pull-down menu 1402, the CPU 201 of the client computer 101 makes a request to the colorimetric apparatus 115 to execute colorimetry and proceeds to step S1611.

In step S1611, the CPU 201 of the client computer 101 displays the colorimetry state display screen 1501 on the display unit 205. The CPU 238 of the colorimetric apparatus 115 transmits a colorimetry result to the client computer 101 according to the progress of the colorimetry. The CPU 201 of the client computer 101 displays a check mark to the side of a measured row in an image of a chart displayed in the region 1502 of the colorimetry state display screen 1501 based on the colorimetry result transmitted from the colorimetric apparatus 115. In step S1612, the CPU 201 of the client computer 101 determines whether the abort button 1505 on the colorimetry state display screen 1501 has been pressed. When it is determined that the abort button 1505 has been pressed, the colorimetry processing is terminated. Meanwhile, when it is determined that the abort button 1505 has not been pressed, the processing proceeds to step S1613.

In step S1613, the CPU 201 of the client computer 101 determines whether the colorimetry completion button 1504 on the colorimetry state display screen 1501 has been pressed. When it is determined that the colorimetry completion button 1504 has not been pressed, the processing is repeated from step S1612. Meanwhile, when it is determined that the colorimetry completion button 1504 has been pressed, the processing proceeds to step S1614.

In step S1614, the CPU 201 of the client computer 101 determines whether all of the patches to be measured have been measured. The determination of step S1614 is performed based on the colorimetry result obtained by the CPU 201 of the client computer 101 and stored in the storage unit 240 or the RAM 239 of the colorimetric apparatus 115. When it is determined that all of the patches have not been measured in step S1614, the processing is repeated from step S1612. Meanwhile, when it is determined that all of the patches have been measured, the processing proceeds to step S1615.

In step S1615, the CPU 201 of the client computer 101 stores the colorimetry result in the storage unit 203 or the RAM 202. In step S1616, the CPU 201 of the client computer 101 transmits the colorimetry result stored in the storage unit 203 or the RAM 202 in step S1615 to the color inspection server 112 and terminates the colorimetry processing.

As described above, by virtue of the present embodiment, when an instruction for printing a chart to be used in color inspection is received, if calibration corresponding to a sheet has not been executed, a screen prompting the user to confirm the continuation of color inspection execution is displayed. This makes it possible to prevent a color inspection result from becoming unsuitable due to unintentional failure to execute calibration.

Second Embodiment

In the following, a second embodiment will be described regarding points of difference from the first embodiment. In the present embodiment, a calibration execution state for a sheet to be used in color inspection is displayed on the print settings screen 801.

Figure 17:
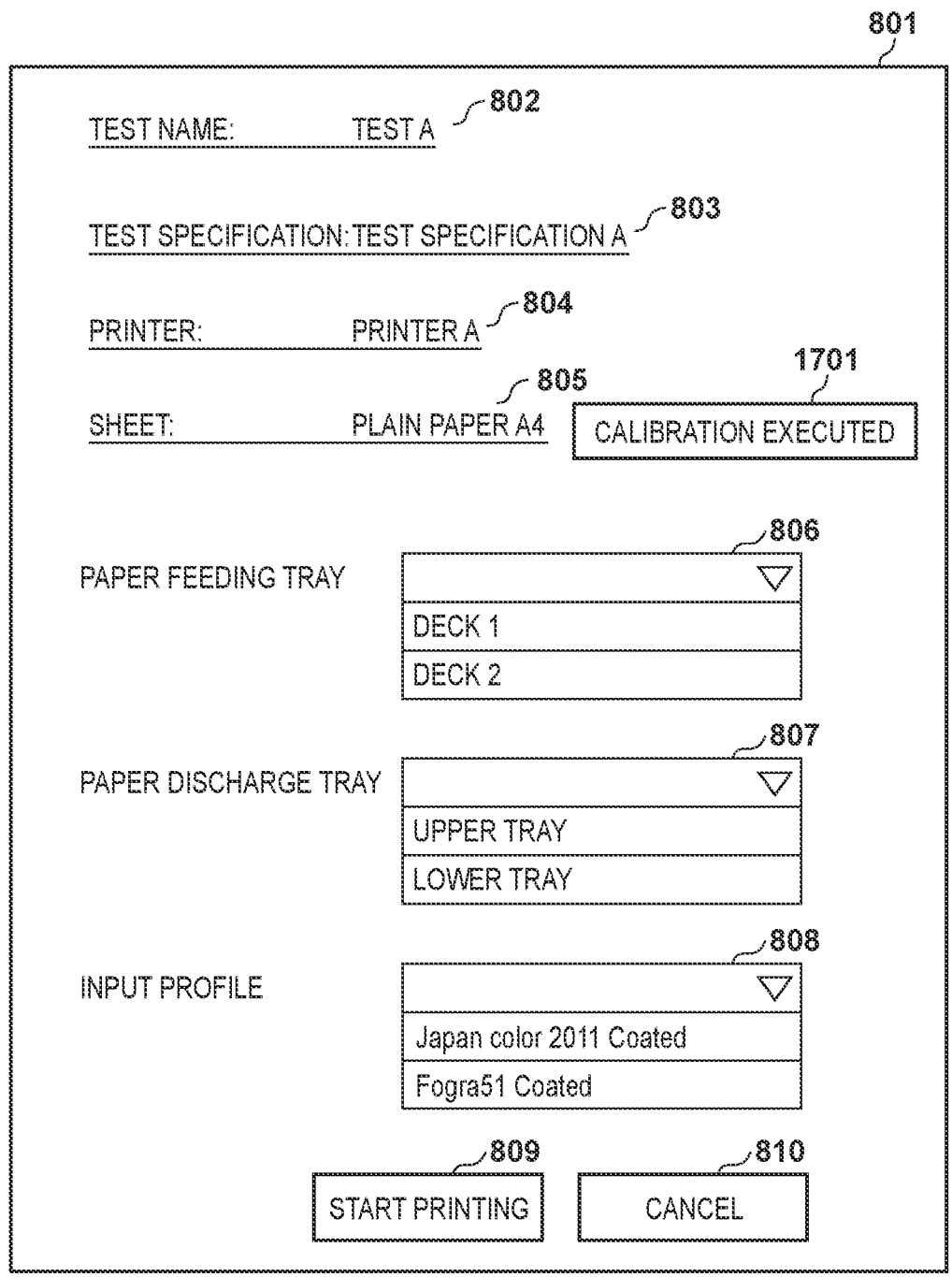
FIG. 17 is a diagram illustrating a print settings screen for a chart to be used in color inspection.

FIG. 17 is a diagram illustrating a print settings screen for performing print settings for a chart to be used in color inspection. A region 1701 is a region displayed to the side of the region 805 in which a sheet to be used in color inspection is displayed and is a region in which whether calibration has been executed for the sheet to be used in color inspection is displayed. By confirming the region 1701, the user can confirm the calibration execution state for the sheet to be used in color inspection before pressing the print start button 809.

Figure 18A:
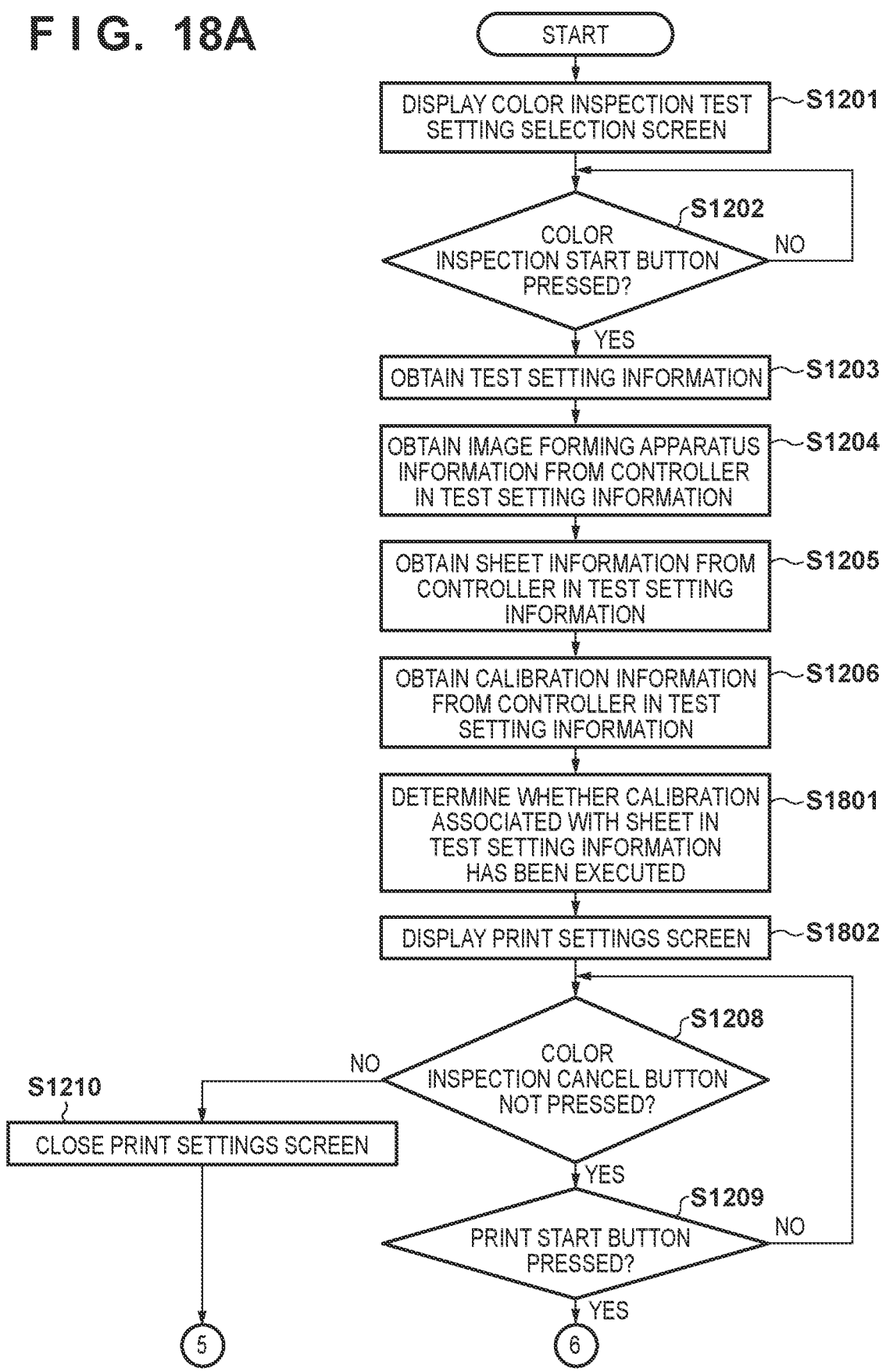
FIGS. 18A and 18B are flowcharts for explaining control processing in the color inspection system.
Figure 18B:
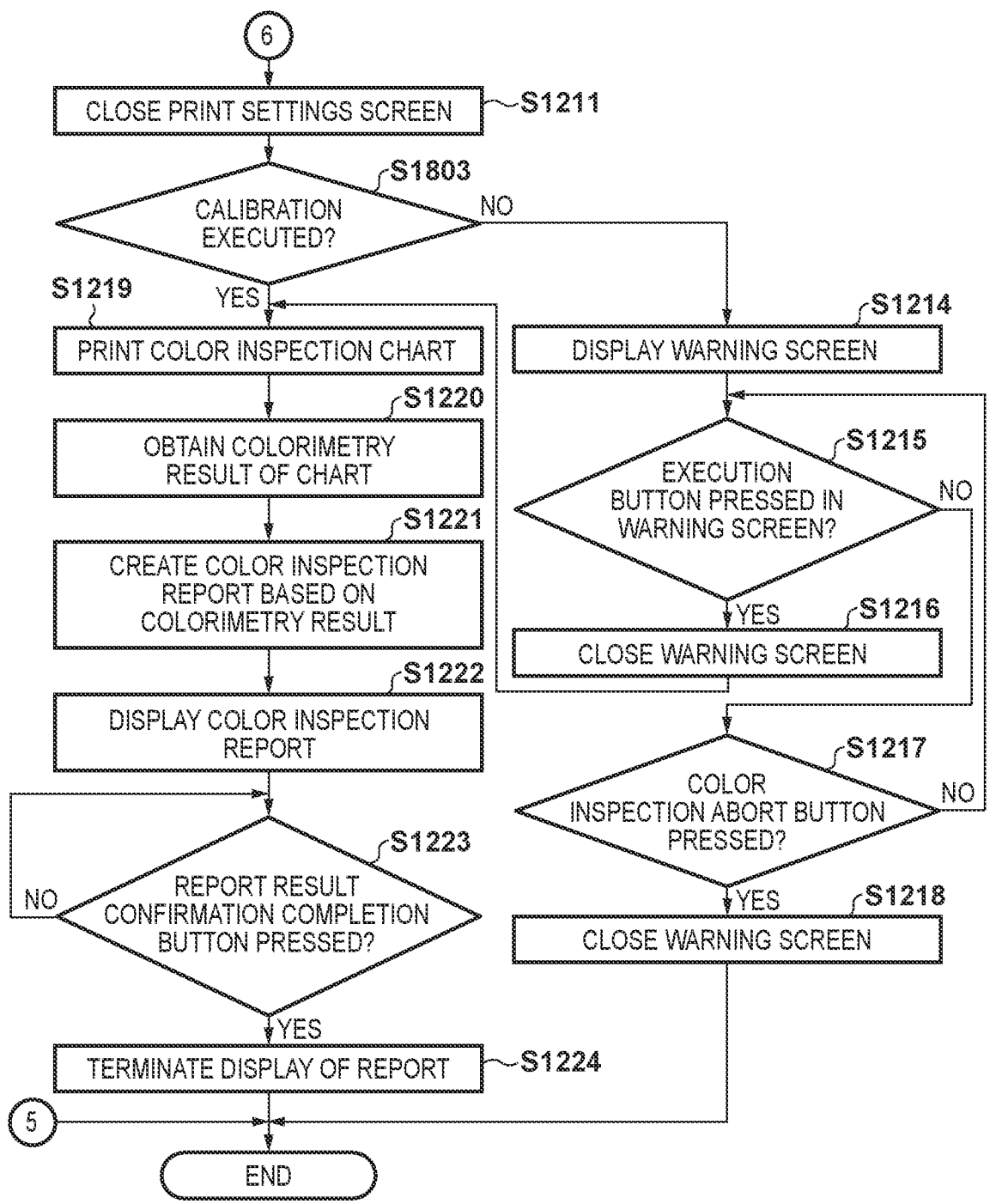

FIGS. 18A and 18B are flowcharts for explaining control processing in the color inspection system according to the present embodiment. In FIGS. 18A and 18B, a calibration execution state for a sheet to be used in color inspection is displayed on the print settings screen 801. The processing of FIGS. 18A and 18B is executed by the CPU 201 of the client computer 101. However, when the processing is executed by a CPU of another apparatus, something to that effect will be mentioned. In addition, an operation of each apparatus to which a request for processing has been made from the CPU 201 of the client computer 101 is executed by a CPU of each apparatus.

In FIGS. 18A and 18B, steps S1201 to S1206, S1208 to S1211, and S1214 to S1224 are the same as in FIGS. 12 A and 12B according to the first embodiment, and so, descriptions thereof will be omitted.

After step S1206, in step S1801, the CPU 201 of the client computer 101 determines whether calibration associated with the sheet indicated by the test sheet information 406 obtained in step S1203 has been performed. In step S1801, the CPU 201 of the client computer 101 first confirms whether the calibration information 704 corresponding to the test sheet information 406 obtained in step S1203 is present in the sheet information table 701. Next, the CPU 201 confirms the calibration date and time information 707 corresponding to the confirmed calibration information 704 in the calibration information table 705.

In step S1802, the CPU 201 of the client computer 101 displays a result of the determination of step S1801 in the region 1701 to the side of the region 805.

After step S1211, in step S1803, the CPU 201 of the client computer 101 determines whether a result of the determination of step S1801 indicates that calibration has been executed. When it is determined that a result of the determination of step S1803 is that calibration has not been executed, the processing proceeds to step S1214. Meanwhile, when it is determined that a result of the determination of step S1803 is that calibration has been executed, the processing proceeds to step S1219. The subsequent processing is the same as described in FIGS. 12A and 12B, and so, descriptions thereof will be omitted.

As described above, by virtue of the present embodiment, information as to whether calibration corresponding to a sheet to be used in color inspection has been executed is displayed on a screen on which an instruction for printing a chart to be used in color inspection can be received. This makes it possible to prevent a color inspection result from becoming inappropriate due to unintentional failure to execute calibration.

Third Embodiment

In the following, a third embodiment will be described regarding points of difference from the first and second embodiments. In the present embodiment, when calibration has not been executed for a sheet to be used in color inspection at the start of printing of the color inspection chart 1001, calibration is executed, and then color inspection is executed.

Figure 19:
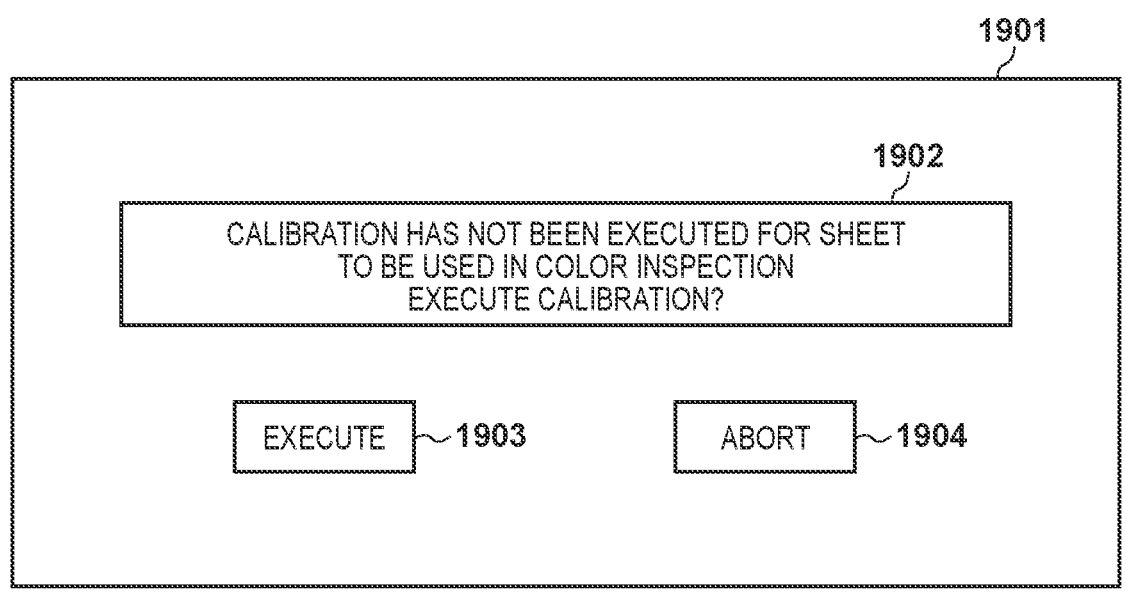
FIG. 19 is a diagram illustrating a calibration execution instruction screen.

FIG. 19 is a diagram illustrating an example of a calibration execution instruction screen to be displayed when the print start button 809 on the print settings screen 801 is pressed in a state in which calibration has not been performed for a sheet to be used in color inspection. A calibration execution instruction screen 1901 is displayed on the display unit 205 by the color inspection UI control unit 301 of the client computer 101. A region 1902 is a region in which a message prompting to execute calibration is displayed. A calibration execution button 1903 is a button to be pressed when calibration is to be executed. An abort button 1904 is a button to be pressed when color inspection is to be aborted.

Figure 20A:
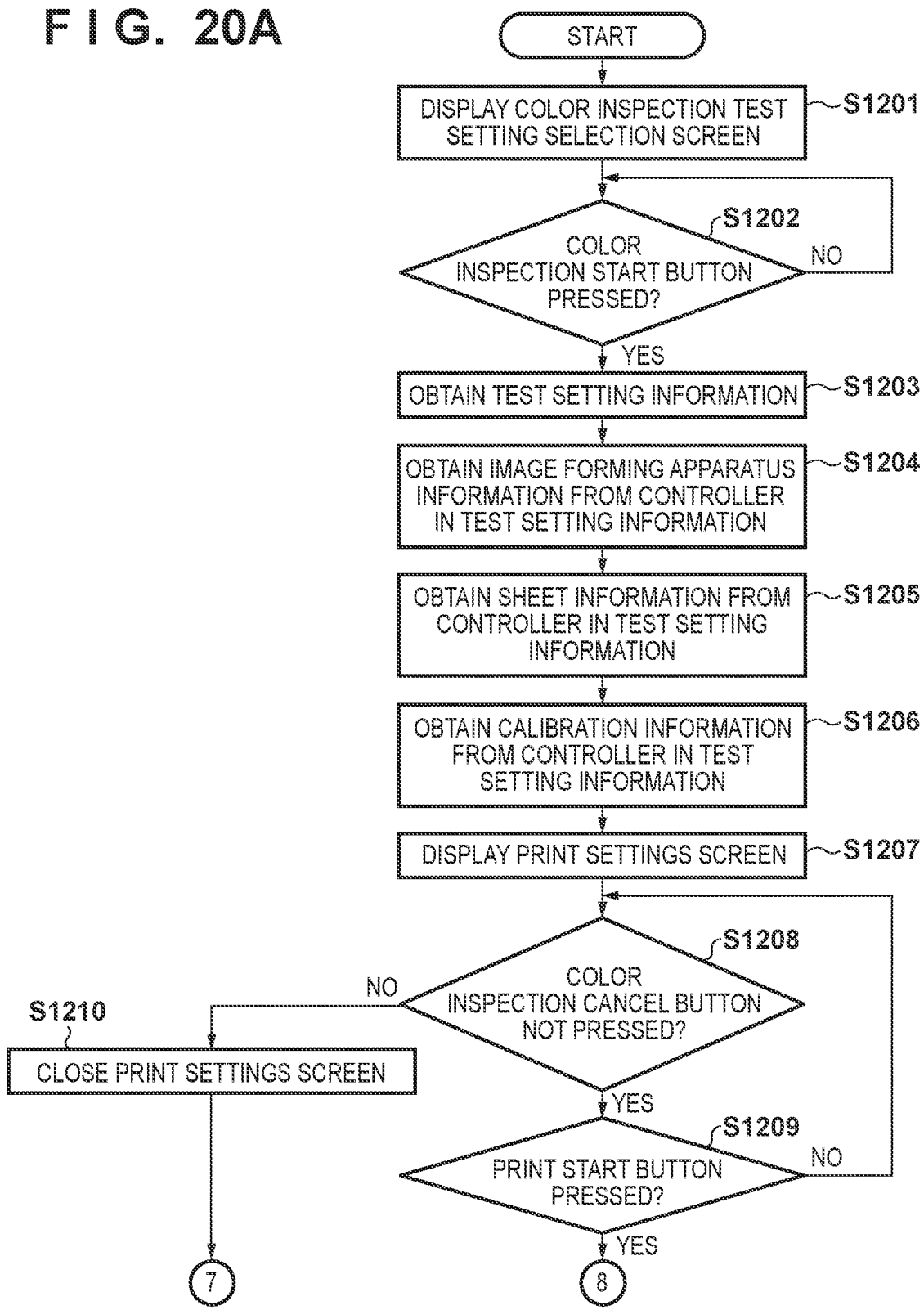
FIGS. 20A and 20B are flowcharts for explaining control processing in the color inspection system.
Figure 20B:
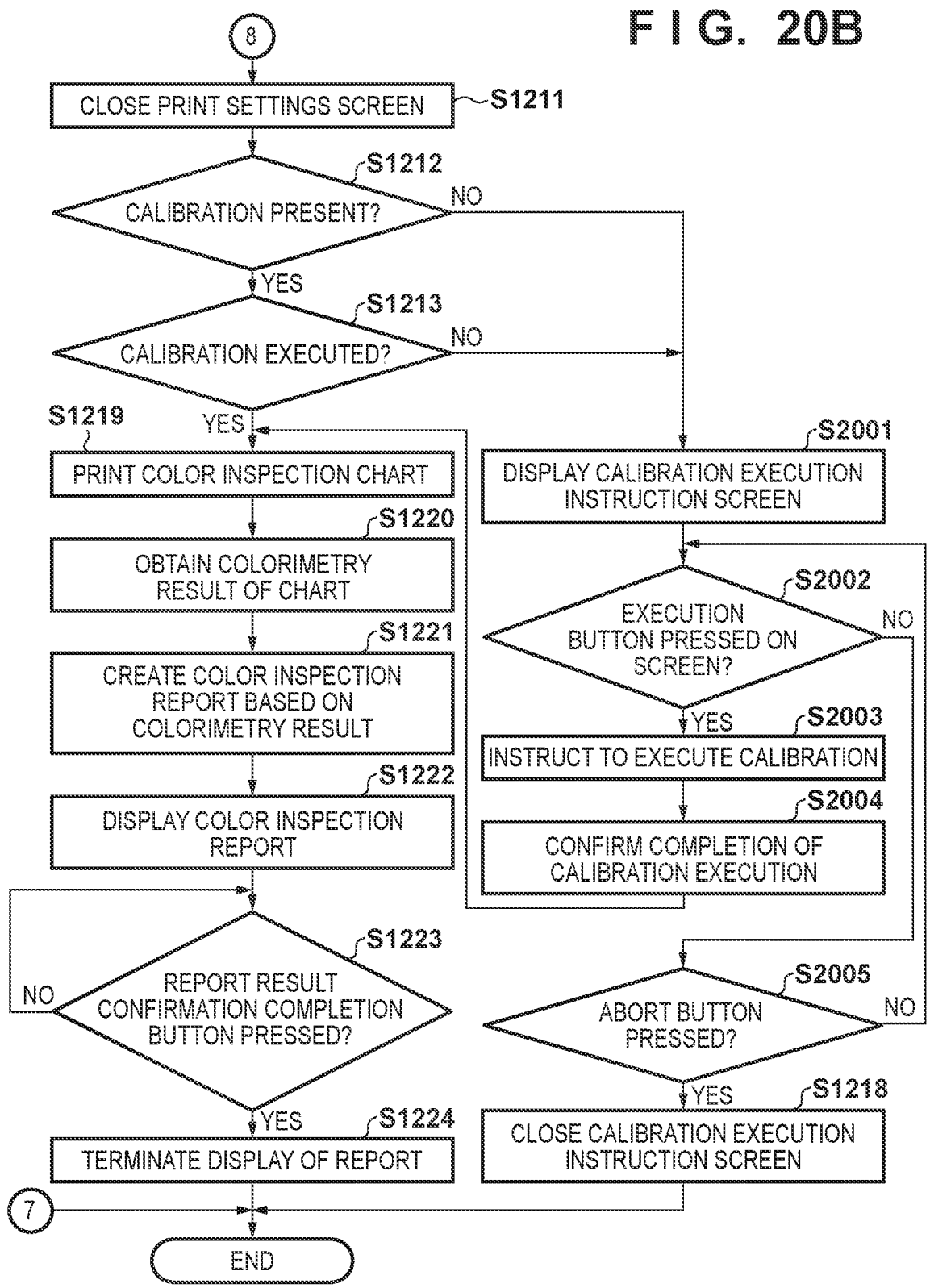

FIGS. 20A and 20B are flowcharts for explaining control processing in the color inspection system according to the present embodiment. In FIGS. 20A and 20B, when calibration has not been performed for a sheet to be used in color inspection, control is performed so as to execute calibration and then execute color inspection. The processing of FIGS. 20A and 20B is executed by the CPU 201 of the client computer 101. However, when the processing is executed by a CPU of another apparatus, something to that effect will be mentioned. In addition, an operation of each apparatus to which a request for processing has been made from the CPU 201 of the client computer 101 is executed by a CPU of each apparatus.

In FIGS. 20A and 20B, steps S1201 to S1213 and S1219 to S1224 are the same as in FIGS. 12A and 12B according to the first embodiment, and so, descriptions thereof will be omitted.

When it is determined to be NO in step S1212 or S1213, in step S2001, the CPU 201 of the client computer 101 displays the calibration execution instruction screen 1901 on the display unit 205 via the color inspection UI control unit 301. In step S2002, the CPU 201 of the client computer 101 determines whether the calibration execution button 1903 on the calibration execution instruction screen 1901 has been pressed. When it is determined that the calibration execution button 1903 has been pressed, the processing proceeds to step S2003.

In step S2003, the CPU 201 of the client computer 101 makes a request to execute calibration to the controller 108 along with information of a sheet to be used in color inspection. Upon request from the client computer 101, the CPU 226 of the controller 108 executes calibration for the sheet to be used in color inspection and, once calibration is complete, notifies the client computer 101 accordingly. In step S2004, the CPU 201 of the client computer 101 confirms the completion of calibration for which an execution instruction has been issued in step S2003 and proceeds to step S1219.

When it is determined that the calibration execution button 1903 has not been pressed in step S2002, the processing proceeds to step S2005. In step S2005, the CPU 201 of the client computer 101 determines whether the abort button 1904 on the calibration execution instruction screen 1901 has been pressed. When it is determined that the abort button 1904 has not been pressed, the processing is repeated from step S2002. Meanwhile, when it is determined that the abort button 1904 has been pressed, the processing proceeds to step S1218. In step S1218, the CPU 201 of the client computer 101 terminates the display of the calibration execution instruction screen 1901 on the display unit 205 and terminates the color inspection processing. The subsequent processing is the same as described in FIGS. 12A and 12B, and so, descriptions thereof will be omitted.

As described above, by virtue of the present embodiment, when calibration has not been executed for a sheet to be used in color inspection, a screen allowing the user to instruct calibration execution is displayed. With such a configuration, it is possible to perform color inspection after performing calibration. This makes it possible to prevent a color inspection result from becoming inappropriate due to unintentional failure to execute calibration.

Fourth Embodiment

A fourth embodiment will be described regarding points of difference from the first to third embodiments. In the present embodiment, when calibration associated with a sheet to be used in color inspection has not been executed within a preset calibration validity period, a screen for confirming the continuation of color inspection execution is displayed.

Figure 21A:
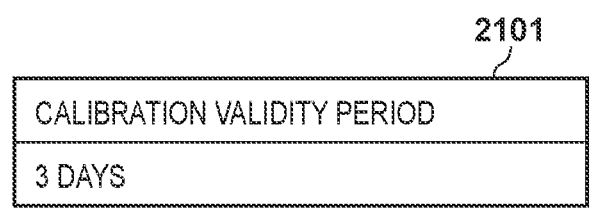
FIGS. 21A and 21B are diagrams illustrating a configuration related to calibration validity period information.

FIG. 21A is a diagram illustrating an example of information indicating a calibration validity period. Calibration validity period information 2101 is information representing a period of time during which calibration is considered valid. The calibration validity period information 2101 is stored in the storage unit 236 of the color inspection server 112.

Figure 21B:
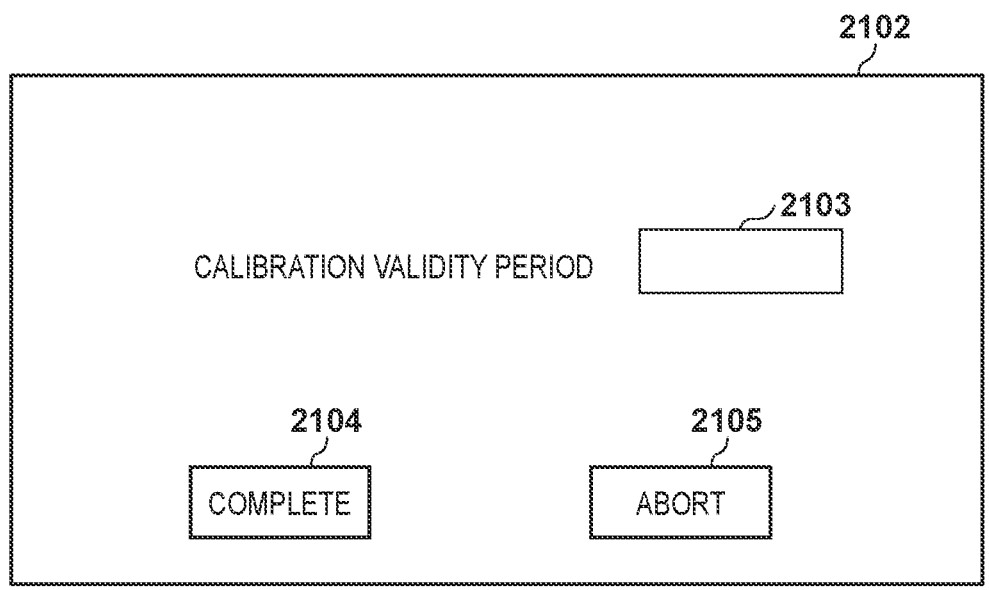

FIG. 21B is a diagram illustrating an example of a setting screen for calibration validity period information. A setting screen 2102 for setting a calibration validity period is a screen to be displayed on the display unit 205 by the CPU 201 of the client computer 101. A region 2103 is a region for receiving input of the calibration validity period information 2101. A completion button 2104 is a button for completing setting of the calibration validity period information 2101. An abort button 2105 is a button for aborting setting of the calibration validity period information 2101. The user can set the calibration validity period information 2101 via the setting screen 2102 on the client computer 101 as advance preparation for color inspection.

Figure 22A:
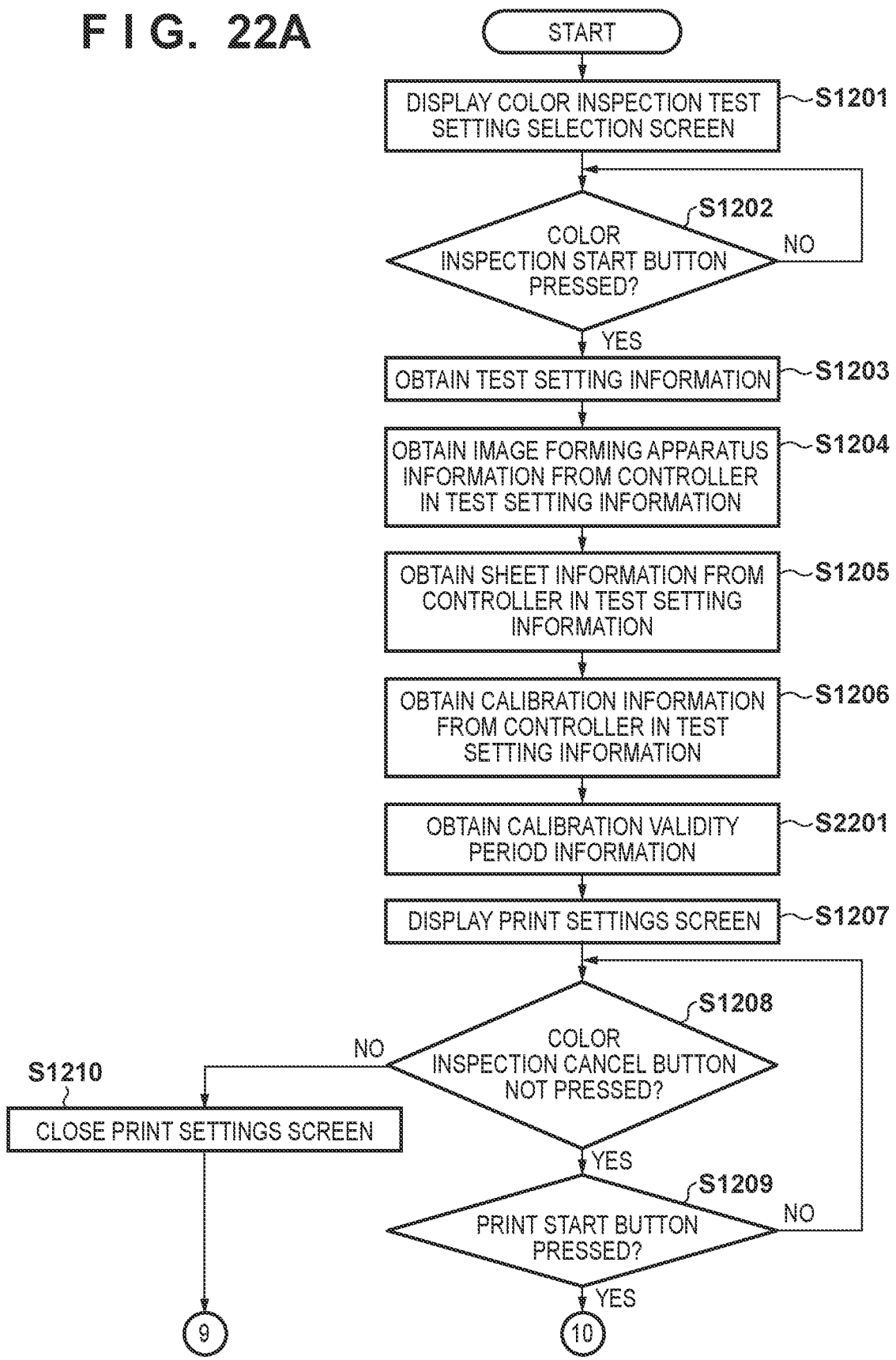
FIGS. 22A and 22B are flowcharts for explaining control processing in the color inspection system.
Figure 22B:
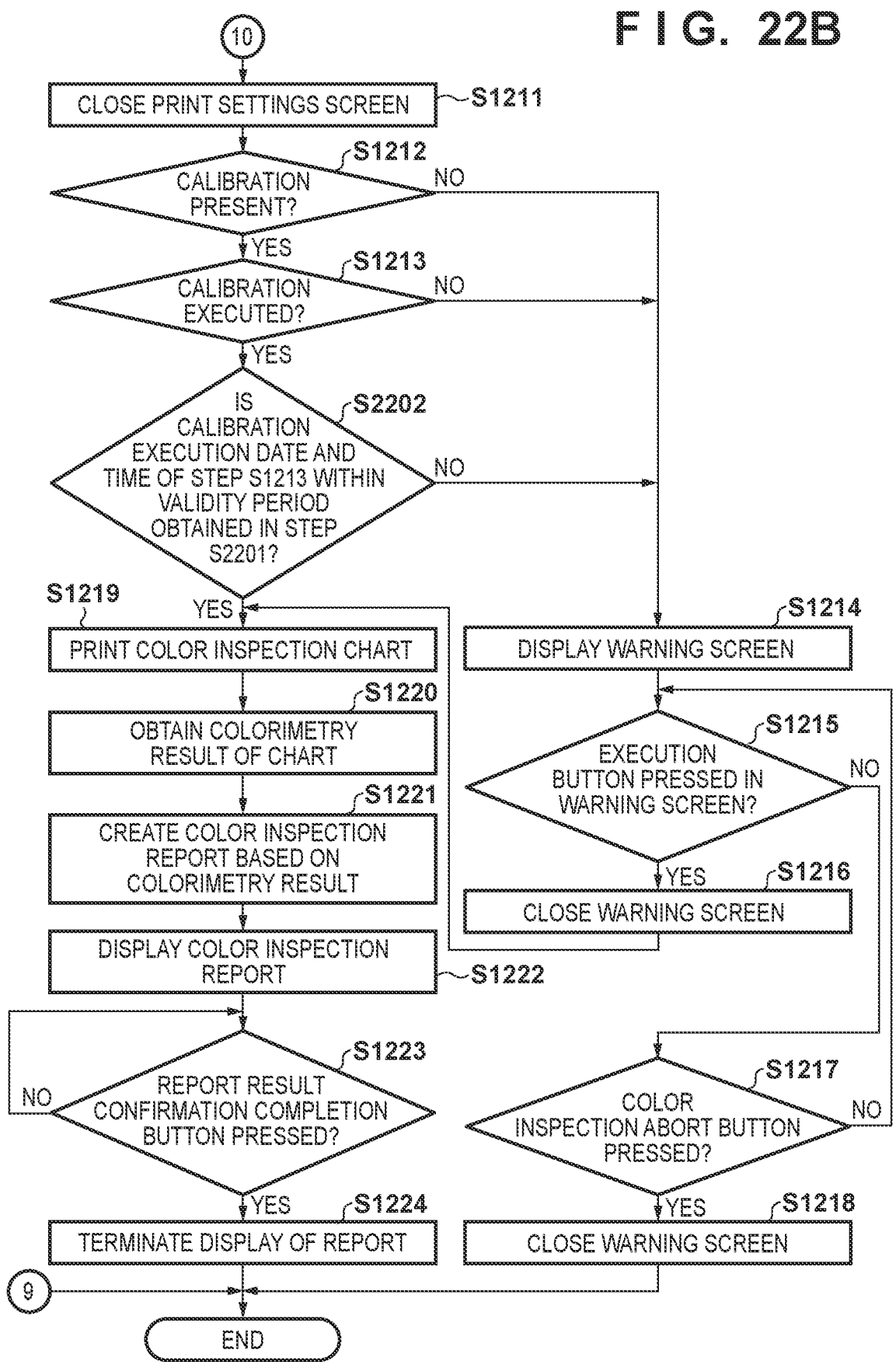

FIGS. 22A and 22B are flowcharts for explaining control processing in the color inspection system according to the present embodiment. In FIGS. 22A and 22B, when calibration associated with a sheet to be used in color inspection has exceeded a preset calibration validity period, control is performed so as to display a screen for confirming the continuation of color inspection execution. The processing of FIGS. 22A and 22B is executed by the CPU 201 of the client computer 101. However, when the processing is executed by a CPU of another apparatus, something to that effect will be mentioned. In addition, an operation of each apparatus to which a request for processing has been made from the CPU 201 of the client computer 101 is executed by a CPU of each apparatus.

In FIGS. 22A and 22B, steps S1201 to S1224, are the same as in FIGS. 12A and 12B according to the first embodiment, and so, descriptions thereof will be omitted.

After step S1206, in step S2201, the CPU 201 of the client computer 101 obtains the calibration validity period information 2101 stored in the storage unit 236 of the color inspection server 112.

When it is determined to be YES in step S1213, the processing proceeds to step S2202. In step S2202, the CPU 201 of the client computer 101 determines whether the calibration determined to have been executed in step S1213 has been executed within a validity period indicated by the calibration validity period information 2101. The determination of step S2202 is performed by comparing the calibration date and time information 707 confirmed in step S1213 and the calibration validity period information 2101 obtained in step S2201. When the calibration determined to have been executed in step S1213 is determined not to have been executed within the validity period indicated by the calibration validity period information 2101, the processing proceeds to step S1214. Meanwhile, when the calibration determined to have been executed in step S1213 is determined to have been executed within the validity period indicated by the calibration validity period information 2101, the processing proceeds to step S1219. The subsequent processing is the same as described in FIGS. 12A and 12B, and so, descriptions thereof will be omitted.

As described above, by virtue of the present embodiment, when calibration that has been executed for a sheet to be used in color inspection has been executed not within a predetermined valid period, a screen for prompting the user to confirm the continuation of color inspection execution is displayed. This makes it possible to prevent color inspection from being executed with calibration having been executed improperly.

Fifth Embodiment

A fifth embodiment will be described regarding points of difference from the first to fourth embodiments. In the present embodiment, when execution conditions are different between color inspection and calibration, a screen prompting the user to confirm the continuation of color inspection execution is displayed.

FIG. 23A is a diagram illustrating an example of a detailed calibration-related information table stored in the storage unit 228 of the controller 108. A detailed calibration information table 2301 is a table indicating what kind of information is included in detailed calibration-related information. A configuration of the detailed calibration information table 2301 indicated here is only an example, and the detailed calibration information table 2301 is not limited to the configuration illustrated in this example. Calibration name information 2302 is information representing a name of calibration. Calibration date and time information 2303 is information representing a date and time of calibration execution. Used sheet information 2304 is information indicating a sheet used at the time of calibration execution. Used colorimetric apparatus information 2305 is information indicating the colorimetric apparatus 115 used in calibration. Used halftone information 2306 is information indicating halftone used in calibration.

FIG. 23B is a diagram illustrating an example of information of halftone that can be used by the image forming apparatus 102 connected to the controller 108. The usable halftone information of FIG. 23B is stored in the storage unit 228 of the controller 108.

A halftone information table 2307 is a table indicating information of halftone that can be used in the image forming apparatus 102. Image forming apparatus name information 2308 is information indicating a name of the image forming apparatus 102 connected to the controller 108 holding the halftone information table 2307. Usable halftone 2309 is information indicating halftone that can be used in the image forming apparatus 102 indicated by the image forming apparatus name information 2308. In FIG. 23B, "resolution" and "gradation" are indicated as examples. The usable halftone 2309 represents, for example, information indicating a halftone pattern represented by randomly placing dots and information indicating a halftone pattern represented by placing dots according to a particular rule.

FIG. 24 is a diagram illustrating a print settings screen for performing print settings for a chart to be used in color inspection according to the present embodiment. A pull-down menu 2401 is a pull-down menu for selecting the colorimetric apparatus 115 to be used in color inspection. In the pull-down menu 2401, the colorimetric apparatus 115 connected to the USB I/F 206 of the client computer 101 is displayed as an option. A pull-down menu 2402 is a pull-down menu for selecting halftone to be used in color inspection. Halftone options displayed in the pull-down menu 2402 are determined by the CPU 201 of the client computer 101 based on the halftone information table stored in the storage unit 228 of the controller 108.

Figure 25A:
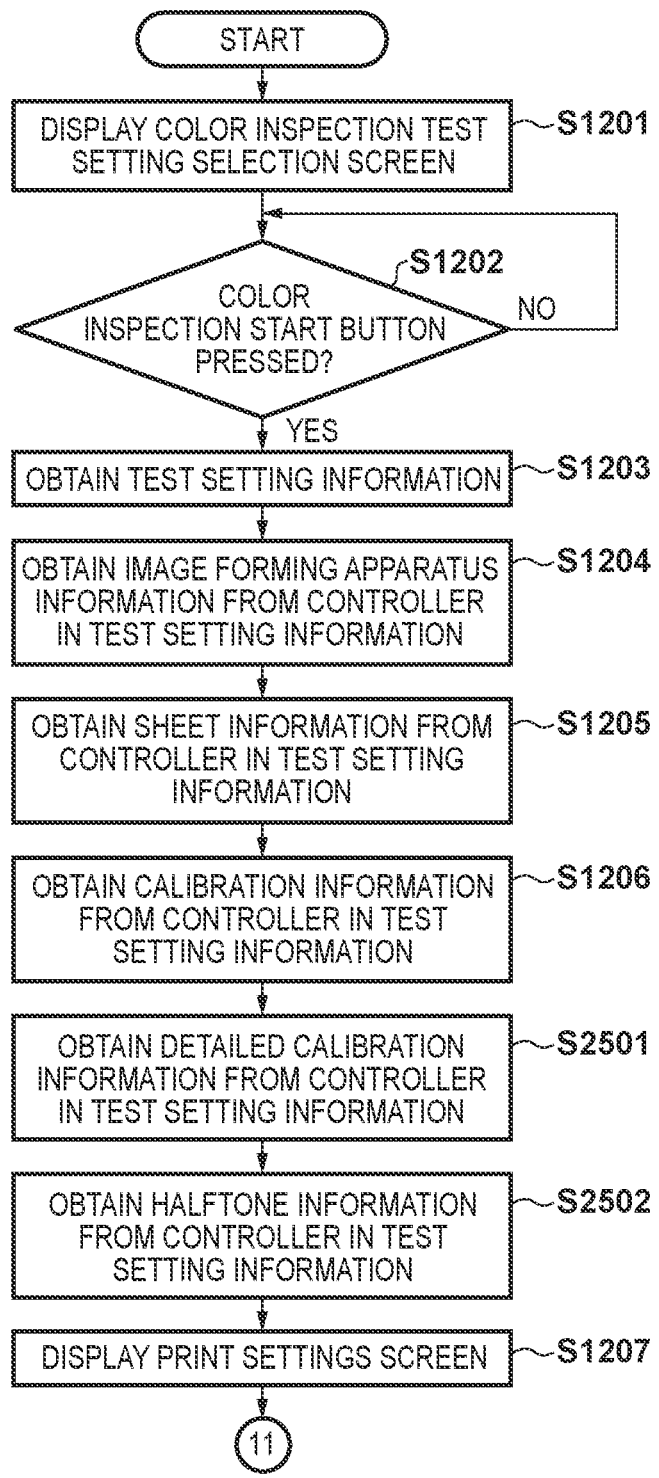
FIGS. 25A to 25C are flowcharts for explaining control processing in the color inspection system.
Figure 25B:
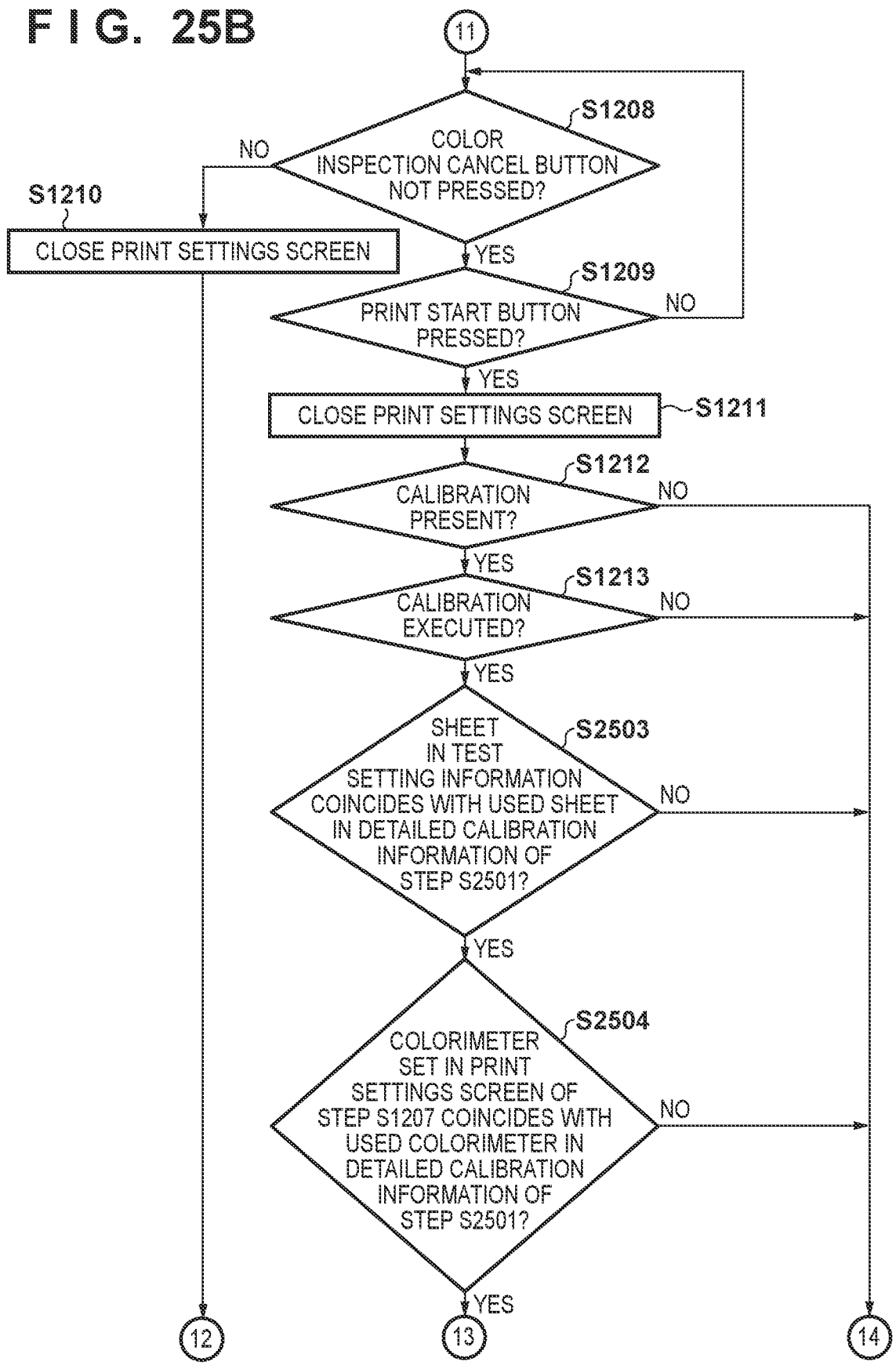
Figure 25C:
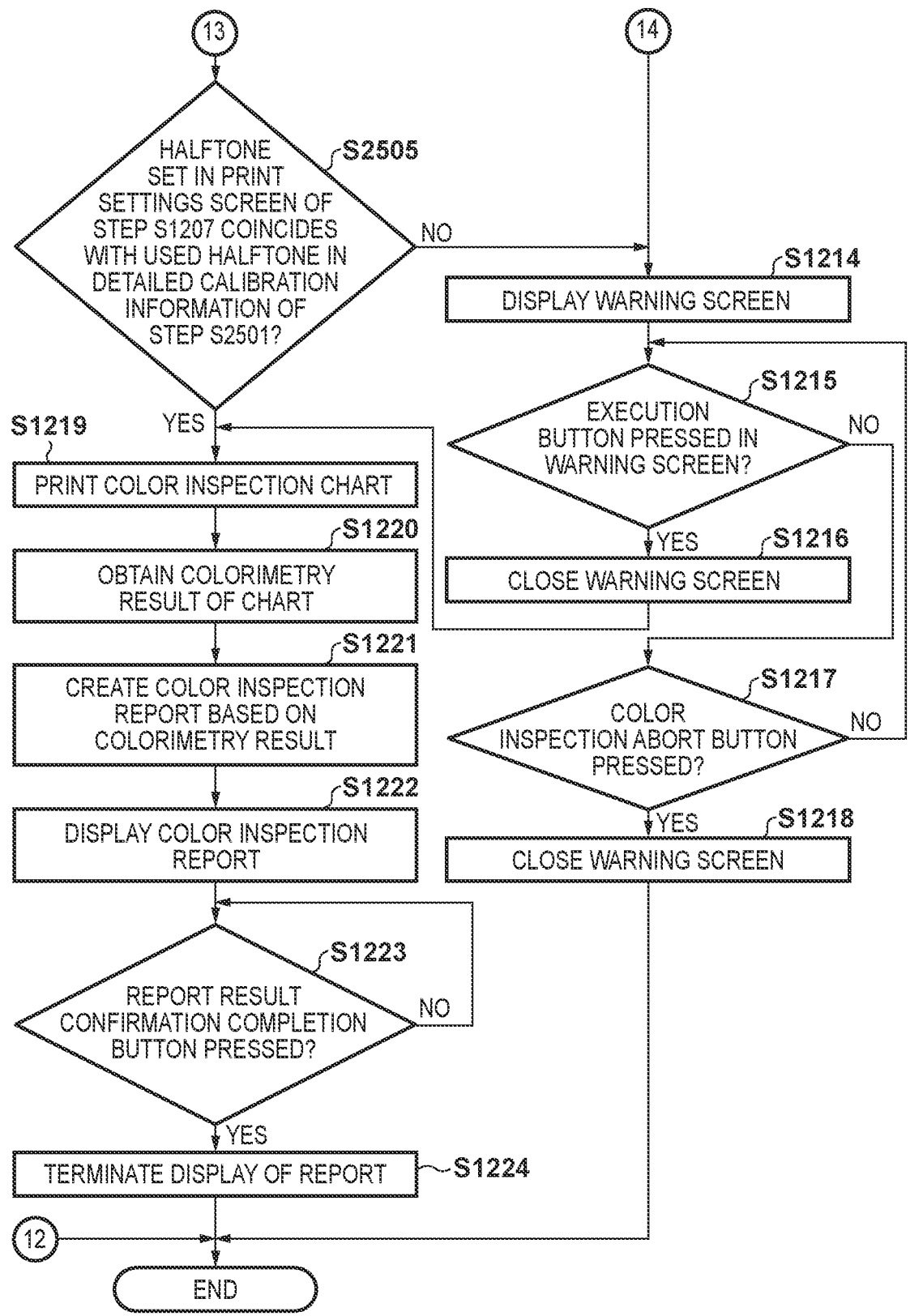

FIGS. 25A to 25C are flowcharts for explaining control processing in the color inspection system according to the present embodiment. In FIGS. 25A to 25C, when execution conditions are different between color inspection and calibration, control is performed so as to display a warning message before the start of color inspection. The processing of FIGS. 25A to 25C is executed by the CPU 201 of the client computer 101. However, when the processing is executed by a CPU of another apparatus, something to that effect will be mentioned. In addition, an operation of each apparatus to which a request for processing has been made from the CPU 201 of the client computer 101 is executed by a CPU of each apparatus.

Steps S1201 to S1224, are the same as in FIGS. 12A and 12B according to the first embodiment, and so, descriptions thereof will be omitted.

After step S1206, in step S2501, the CPU 201 of the client computer 101 obtains the detailed calibration information table 2301 by making a request for the detailed calibration information table 2301 to the controller 108 indicated by the controller information 405 obtained in step S1203. The obtained detailed calibration information table 2301 is stored in the RAM 202 of the client computer 101.

In step S2502, the CPU 201 of the client computer 101 obtains the halftone information table 2307 by making a request for the halftone information table 2307 to the controller 108 indicated by the controller information 405 obtained in step S1203. The obtained halftone information table 2307 is stored in the RAM 202 of the client computer 101.

When it is determined to be YES in step S1213, the processing proceeds to step S2503. In step S2503, the CPU 201 of the client computer 101 determines whether the calibration determined to have been executed in step S1213 has been performed using a sheet indicated by the test sheet information obtained in step S1203. The determination of step S2503 is performed by comparing the used sheet information 2304 corresponding to the calibration determined to have been executed in step S1213 and the test sheet information 406 obtained in step S1203. When the calibration determined to have been executed in step S1213 is determined not to have been executed using a sheet indicated by the test sheet information obtained in step S1203, the processing proceeds to step S1214. Meanwhile, when the calibration determined to have been executed in step S1213 is determined to have been executed using a sheet indicated by the test sheet information obtained in step S1203, the processing proceeds to step S2504.

In step S2504, it is determined whether calibration that has been determined to have been executed in step S1213 has been executed using the colorimetric apparatus 115 selected in the pull-down menu 2401. The determination of step S2504 is performed based on whether the used colorimetric apparatus information 2305 corresponding to the calibration determined to have been executed in step S1213 and the colorimetric apparatus 115 selected in the pull-down menu 2401 coincide. When the calibration determined to have been executed in step S1213 is determined not to have been executed using the colorimetric apparatus 115 selected in the pull-down menu 2401, the processing proceeds to step S1214. Meanwhile, when the calibration determined to have been executed in step S1213 is determined to have been executed using the colorimetric apparatus 115 selected in the pull-down menu 2401, the processing proceeds to step S2505.

In step S2505, it is determined whether calibration that has been determined to have been executed in step S1213 has been executed using the halftone selected in the pull-down menu 2402. The determination of step S2505 is performed based on whether the used halftone information 2306 corresponding to the calibration determined to have been executed in step S1213 and the halftone selected in the pull-down menu 2402 coincide. When the calibration determined to have been executed in step S1213 is determined not to have been executed using the halftone selected in the pull-down menu 2402, the processing proceeds to step S1214. Meanwhile, when the calibration determined to have been executed in step S1213 is determined to have been executed using the halftone selected in the pull-down menu 2402, the processing proceeds to step S1219. The subsequent processing is the same as described in FIGS. 12A and 12B, and so, descriptions thereof will be omitted.

As described above, by virtue of the present embodiment, when execution conditions are different between color inspection and calibration, a screen prompting the user to confirm the continuation of color inspection execution is displayed. This makes it possible to prevent color inspection from being executed with calibration having been executed improperly.

In the present embodiment, it has been described that three steps (steps S2503, S2504, and S2505)' worth of determination as to whether execution conditions are different between color inspection and calibration is performed. However, the determination does not always need be configured by these three steps and may be performed using only some of the three steps.

Sixth Embodiment

A sixth embodiment will be described regarding points of difference from the first to fifth embodiments. In the present embodiment, a calibration execution standard is held for each sheet, and it is determined whether calibration has been executed based on that execution standard.

FIG. 26 is a diagram illustrating an example of a standard information table indicating information of a calibration execution standard for each sheet. A standard information table 2601 is a table indicating information of a calibration execution standard for each sheet. The standard information table 2601 is held in the storage unit 236 of the color inspection server 112 for each piece of information of the controller 108. Controller name information 2602 is information indicating a name of the controller 108 to which the standard information table 2601 is applied. Sheet name information 2603 is information representing a name of a sheet. Calibration validity period information 2604 is information indicating a calibration validity period for each sheet. Calibration designated sheet information 2605 is information for designating a sheet to be used when calibration for each sheet is to be performed.

Figure 27:
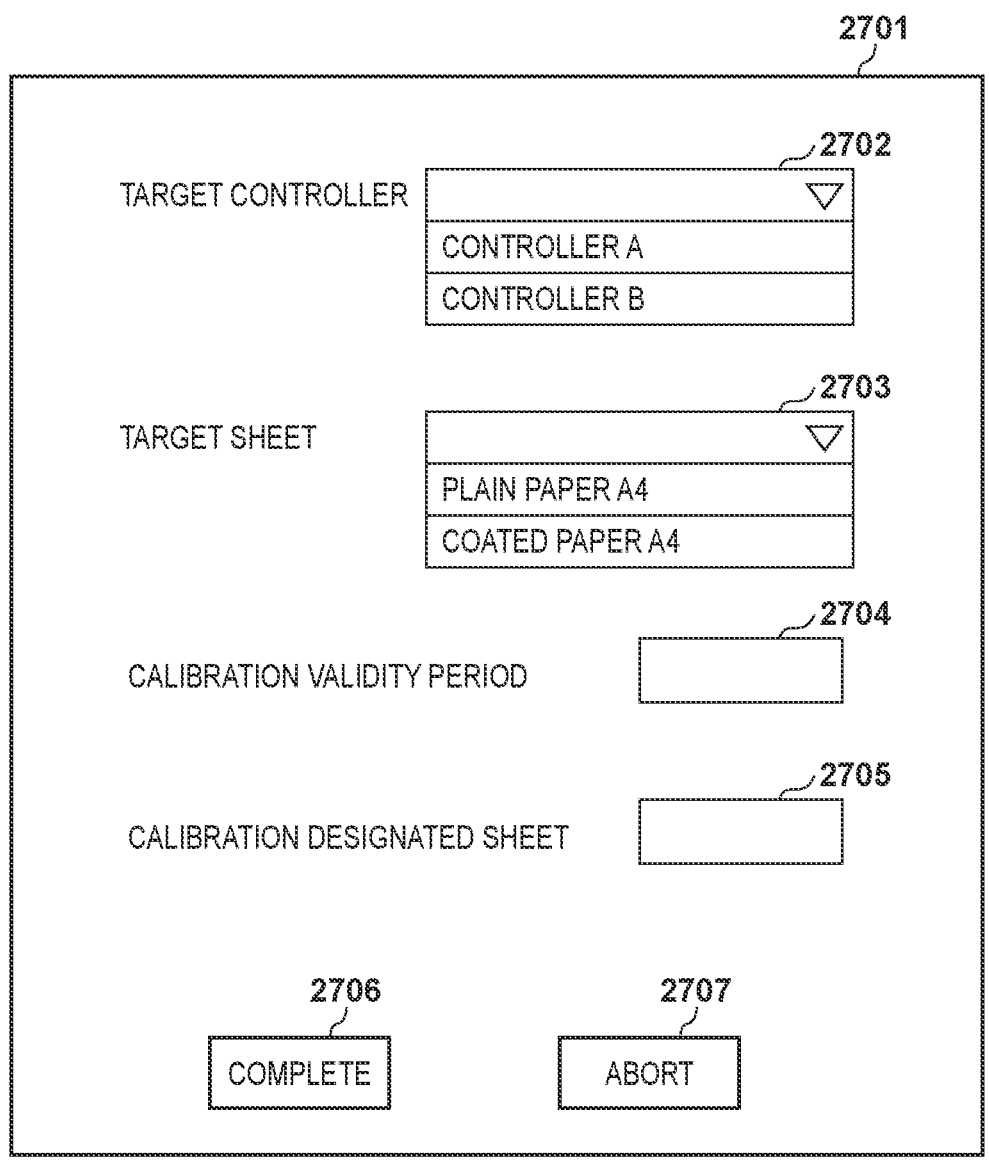
FIG. 27 is a diagram illustrating a screen for setting information in a standard information table.

FIG. 27 is a diagram illustrating an example of a screen for setting information in the standard information table 2601. A reference information setting screen 2701 is a setting screen for setting information in the standard information table 2601. The reference information setting screen 2701 is displayed on the display unit 205 by the color inspection UI control unit 301 of the client computer 101. A pull-down menu 2702 is a pull-down menu for selecting the controller name information 2602 in the standard information table 2601. A pull-down menu 2703 is a pull-down menu for selecting the sheet name information 2603 in the standard information table 2601. A region 2704 is a region for receiving input of the calibration validity period information 2604 in the standard information table 2601. A region 2705 is a region for receiving input of the calibration designated sheet information 2605 in the standard information table 2601. A setting completion button 2706 is a button to be pressed when setting of information in the standard information table 2601 is to be completed. An abort button 2707 is a button to be pressed when setting of information in the standard information table 2601 is to be terminated. The user sets the standard information table 2601 via the reference information setting screen 2701 displayed on the display unit 205 of the client computer 101 as advance preparation for color inspection.

Figure 28A:
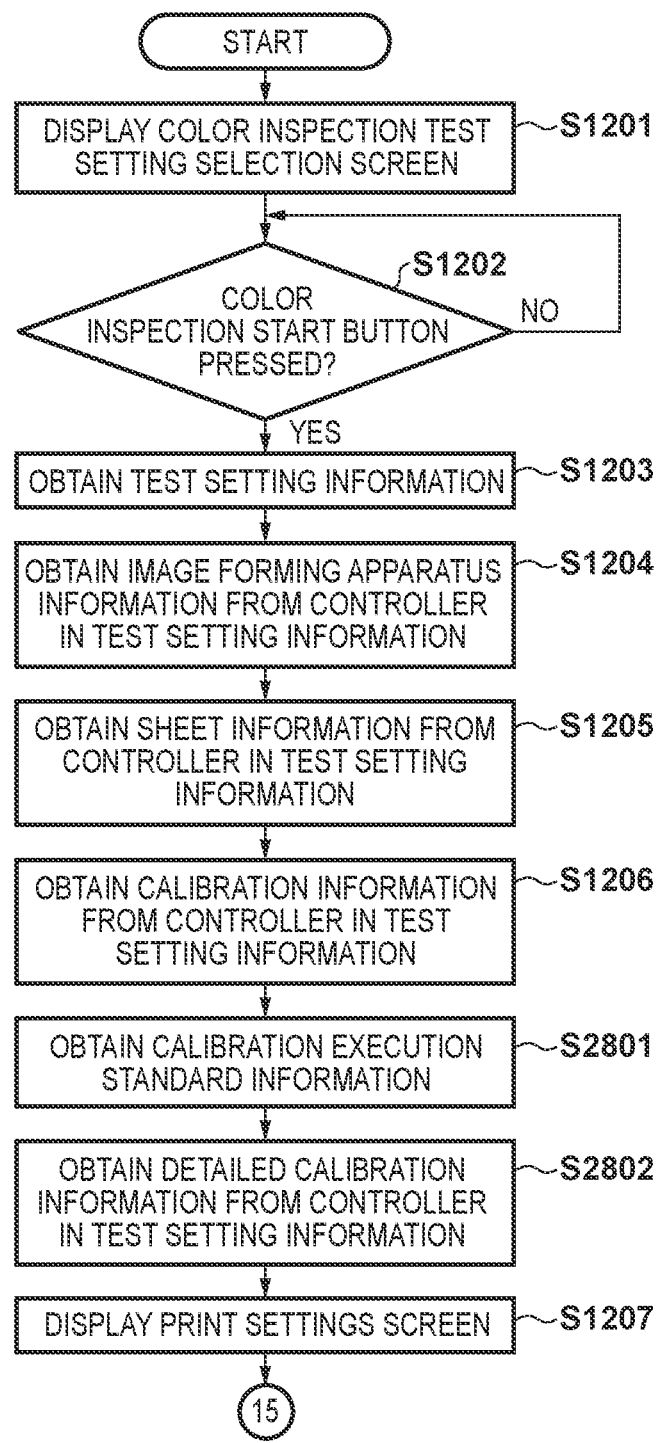
FIGS. 28A to 28C are flowcharts for explaining control processing in the color inspection system.
Figure 28B:
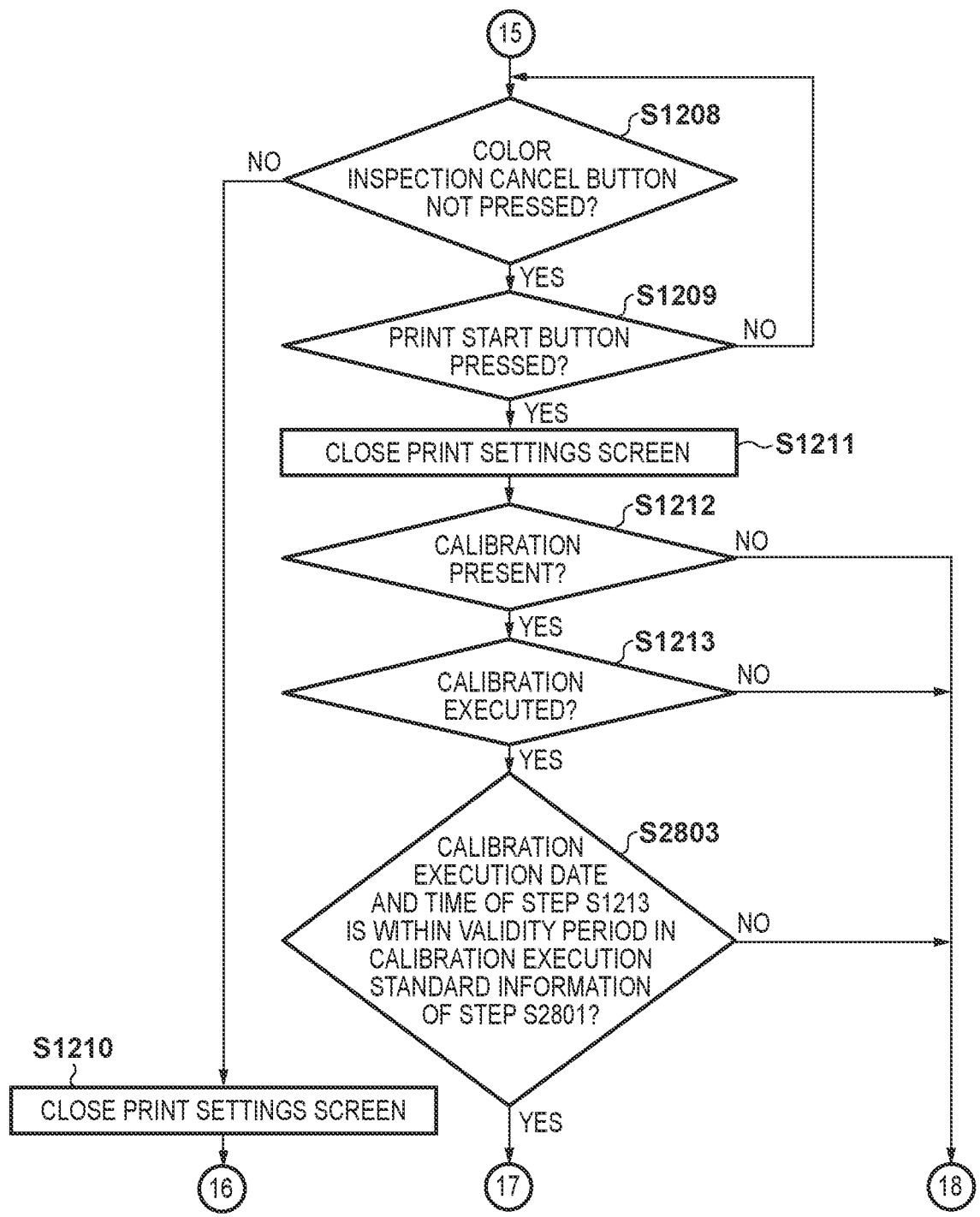
Figure 28C:
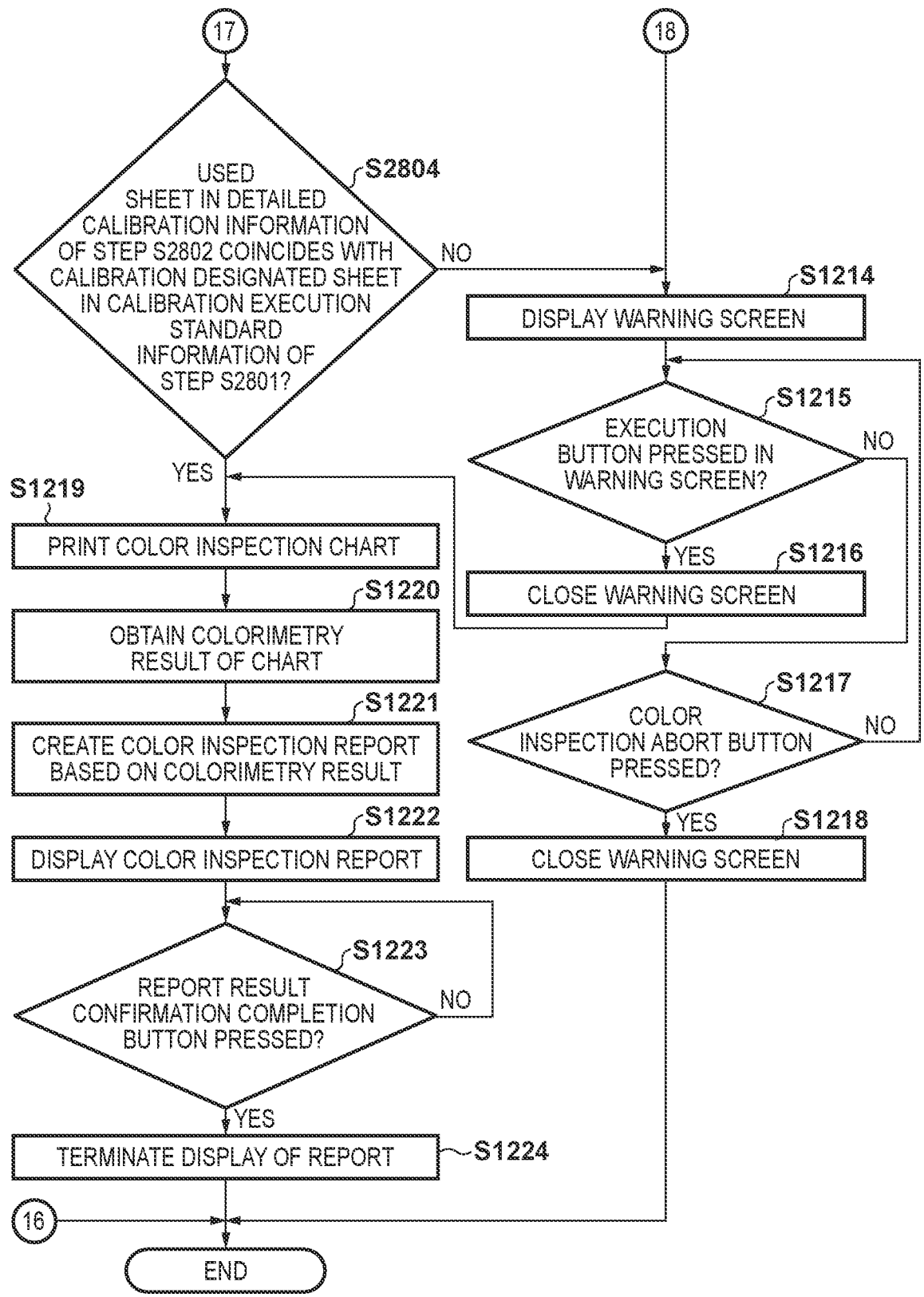

FIGS. 28A to 28C are flowcharts for explaining control processing in the color inspection system according to the present embodiment. In FIGS. 28A to 28C, a calibration execution standard is held for each sheet, and it is determined whether calibration is properly executed based on that execution standard. The processing of FIGS. 28A to 28C is executed by the CPU 201 of the client computer 101. However, when the processing is executed by a CPU of another apparatus, something to that effect will be mentioned. In addition, an operation of each apparatus to which a request for processing has been made from the CPU 201 of the client computer 101 is executed by a CPU of each apparatus.

In FIGS. 28A to 28C, steps S1201 to S1224, are the same as in FIGS. 12A and 12B according to the first embodiment, and so, descriptions thereof will be omitted.

After step S1206, in step S2801, the CPU 201 of the client computer 101 obtains the standard information table 2601 by making a request for the standard information table 2601 to the color inspection server 112. In step S2802, the CPU 201 of the client computer 101 obtains the detailed calibration information table 2301 by making a request for the detailed calibration information table 2301 to the controller 108 indicated by the controller information 405 obtained in step S1203.

When it is determined to be YES in step S1213, the processing proceeds to step S2803. In step S2803, the CPU 201 of the client computer 101 determines whether the calibration determined to have been executed in step S1213 has been executed within a period indicated by the calibration validity period information 2604 of the standard information table 2601. The determination of step S2803 is performed by comparing the calibration validity period information 2604 and the calibration date and time information 707 of the calibration determined to have been executed in step S1213. The calibration validity period information 2604 is associated with the controller information 405 and the test sheet information 406 obtained in step S1203. When the calibration determined to have been executed in step S1213 is determined not to have been executed within the period indicated by the calibration validity period information 2604, the processing proceeds to step S1214. Meanwhile, when the calibration determined to have been executed in step S1213 is determined to have been executed within the period indicated by the calibration validity period information 2604, the processing proceeds to step S2804.

In step S2804, the CPU 201 of the client computer 101 determines whether the calibration determined to have been executed in step S1213 has been executed using a sheet indicated by the calibration designated sheet information 2605 of the standard information table 2601. The determination of step S2804 is performed by comparing the calibration designated sheet information 2605 and the used sheet information 2304 corresponding to the calibration determined to have been executed in step S1213. The calibration designated sheet information 2605 is associated with the controller information 405 and the test sheet information 406 obtained in step S1203. When it is determined that the calibration determined to have been executed in step S1213 has not been executed using the sheet indicated by the calibration designated sheet information 2605 in the standard information table 2601, the processing proceeds to step S1214. Meanwhile, when it is determined that the calibration determined to have been executed in step S1213 has been executed using the sheet indicated by the calibration designated sheet information 2605 in the standard information table 2601, the processing proceeds to step S1219. The subsequent processing is the same as described in FIGS. 12A and 12B, and so, descriptions thereof will be omitted.

As described above, by virtue of the present embodiment, a calibration execution standard is held for each sheet, and it is determined whether calibration has been executed based on that execution standard. Then, when calibration has not been executed based on the execution standard, a screen prompting the user to confirm the continuation of color inspection execution is displayed. This makes it possible to prevent color inspection from being executed with calibration having been executed improperly.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-117430, filed Jul. 22, 2022, which is hereby incorporated by reference herein in their entirety.

What is claimed is:

1. An information processing apparatus comprising:
at least one memory and at least one processor which function as:
a display control unit configured to cause a display unit to display a print settings screen for causing an image forming apparatus to print, on a printing medium, a plurality of patches representing colorimetry targets readable by a colorimetric apparatus;
a reception unit configured to receive an instruction for the printing via the print settings screen;
a print control unit configured to cause the image forming apparatus to start the printing of the plurality of patches based on the received instruction for the printing;
an obtaining unit configured to obtain information related to calibration corresponding to the printing medium; and a determination unit configured to determine whether calibration has been executed for the printing medium based on the obtained information related to calibration, wherein in a case where it is determined that the calibration has not been executed, the print control unit does not cause the printing to be started even when the instruction for the printing is received by the reception unit, and the display control unit causes the display unit to display a screen based on that the calibration having not been executed.

2. The information processing apparatus according to claim 1, wherein in a case where, although the calibration has been executed for the printing medium, the executed calibration does not satisfy a condition, the determination unit determines that the calibration has not been executed.

3. The information processing apparatus according to claim 2, wherein the condition includes that the executed calibration is calibration that has been executed within a predetermined period.

4. The information processing apparatus according to claim 2, wherein the condition includes that information of a printing medium used in the executed calibration and information of a printing medium to be used in the printing of the plurality of patches are the same.

5. The information processing apparatus according to claim 2, wherein the condition includes that information of halftone used in the executed calibration and information of halftone to be used in the image forming apparatus are the same.

6. The information processing apparatus according to claim 2, wherein the condition includes that information of a colorimetric apparatus used in the executed calibration and information of a colorimetric apparatus to be used in colorimetry of the plurality of patches are the same.

7. The information processing apparatus according to claim 2, wherein the condition includes that the executed calibration is calibration that has been executed according to a predetermined standard.

8. The information processing apparatus according to claim 7, wherein the predetermined standard includes at least one selected from a group including of information of a printing medium and information of a period for calibration execution.

9. The information processing apparatus according to claim 1, wherein the screen based on the calibration having not been executed is a screen for receiving an instruction to cause the printing of the plurality of patches to be started.

10. The information processing apparatus according to claim 1, wherein the screen based on the calibration having not been executed is a screen for receiving an instruction to execute the calibration.

11. The information processing apparatus according to claim 10, further comprising: a unit configured to, in a case where an instruction for executing the calibration has been received via the screen, request an apparatus configured to manage a job to be executed in the image forming apparatus to execute calibration.

12. The information processing apparatus according to claim 1, wherein the display control unit displays information indicating whether the calibration has been executed in the print settings screen.

13. The information processing apparatus according to claim 1, wherein the display control unit causes the display unit to display a screen that receives an instruction for executing inspection of color quality of the image forming apparatus using a result of colorimetry and, in a case where the instruction has been received on the screen, cause the display unit to display the print settings screen.

14. The information processing apparatus according to claim 13, wherein the screen that receives the instruction for executing the inspection of color quality is further capable of receiving a setting for executing the inspection of color quality.

15. The information processing apparatus according to claim 14, wherein the setting includes designation of at least one selected from a group including of the image forming apparatus, the colorimetric apparatus, and halftone to be used in the image forming apparatus.

16. The information processing apparatus according to claim 13, wherein in a case where the determination unit determines that the calibration has been executed, the print control unit causes the image forming apparatus to start the printing of the plurality of patches based on the instruction for the printing received by the reception unit.

17. The information processing apparatus according to claim 16, further comprising: a unit configured to, after the plurality of patches have been printed, request the colorimetric apparatus to perform colorimetry of the printed plurality of patches.

18. The information processing apparatus according to claim 17, further comprising: an inspection unit configured to, after the colorimetry of the printed plurality of patches has been performed, execute the inspection of color quality.

19. The information processing apparatus according to claim 18, wherein the display control unit causes the display unit to display a result of the inspection of color quality by the inspection unit.

20. An information processing apparatus according to claim 1, further comprising:

a storage unit configured to store the information related to calibration, wherein the information related to calibration includes information of at least one selected from a group including of calibration having been executed or not having been executed, a calibration execution date, and association between calibration and a printing medium.

21. A method comprising:

causing a display unit to display a print settings screen for causing an image forming apparatus to print, on a printing medium, a plurality of patches representing colorimetry targets readable by a colorimetric apparatus;

receiving an instruction for the printing via the print settings screen;

causing the image forming apparatus to start the printing of the plurality of patches based on the received instruction for the printing;

obtaining information related to calibration corresponding to the printing medium; and determining whether calibration has been executed for the printing medium based on the obtained information related to calibration, wherein in a case where it is determined that the calibration has not been executed, the printing is not caused to be started even when the instruction for the printing is received, and the display unit is caused to display a screen based on that the calibration having not been executed.

22. A non-transitory computer-readable storage medium storing a program configured to cause a computer of an information processing apparatus to function to:

cause a display unit to display a print settings screen for causing an image forming apparatus to print, on a printing medium, a plurality of patches representing colorimetry targets readable by a colorimetric apparatus;

receive an instruction for the printing via the print settings screen;

cause the image forming apparatus to start the printing of the plurality of patches based on the received instruction for the printing;

obtain information related to calibration corresponding to the printing medium; and determine whether calibration has been executed for the printing medium based on the obtained information related to calibration, wherein in a case where it is determined that the calibration has not been executed, the printing is not caused to be started even when the instruction for the printing is received, and the display unit is caused to display a screen based on that the calibration having not been executed.

* * * * *